(12) United States Patent
Baek et al.

(10) Patent No.: US 10,959,288 B2
(45) Date of Patent: Mar. 23, 2021

(54) APPARATUS AND METHOD FOR PROCESSING PACKETS IN WIRELESS COMMUNICATION SYSTEM

(71) Applicant: Samsung Electronics Co., Ltd., Suwon-si (KR)

(72) Inventors: Sangkyu Baek, Suwon-si (KR); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 16/251,852

(22) Filed: Jan. 18, 2019

(65) Prior Publication Data
US 2019/0254115 A1 Aug. 15, 2019

(30) Foreign Application Priority Data

Feb. 14, 2018 (KR) .................. 10-2018-0018831

(51) Int. Cl.
*H04L 12/26* (2006.01)
*H04W 80/08* (2009.01)
(Continued)

(52) U.S. Cl.
CPC .......... *H04W 80/08* (2013.01); *H04L 1/1874* (2013.01); *H04W 28/0289* (2013.01);
(Continued)

(58) Field of Classification Search
None
See application file for complete search history.

(56) References Cited

U.S. PATENT DOCUMENTS

| 8,625,415 B2 | 1/2014 | Sebire et al. |
| 2007/0133405 A1* | 6/2007 | Bowra .................. H04L 65/602 370/230 |

(Continued)

FOREIGN PATENT DOCUMENTS

| KR | 10-2018-0090148 A | 8/2018 |
| KR | 10-2018-0108389 A | 10/2018 |
| WO | 2010085043 A2 | 7/2010 |

OTHER PUBLICATIONS

International Search Report dated Jun. 26, 2019, issued in an International application No. PCT/KR2019/000746.
(Continued)

*Primary Examiner* — Brandon M Renner
(74) *Attorney, Agent, or Firm* — Jefferson IP Law, LLP

(57) ABSTRACT

The disclosure relates to a pre-$5^{th}$-Generation (5G) or 5G communication system to be provided for supporting higher data rates beyond $4^{th}$-generation (4G) communication system such as long term evolution (LTE). A method of operating a user equipment (UE) and an apparatus therefor are provided. The method includes detecting an occurrence of a first state related to a state of a buffer for a packet data convergence protocol (PDCP) entity, transmitting a request message indicating the occurrence of the first state to a base station (BS), and receiving one or more packets from the BS based on transmission control performed based on the request message.

12 Claims, 30 Drawing Sheets

(51) Int. Cl.
*H04W 76/15* (2018.01)
*H04W 28/06* (2009.01)
*H04W 28/02* (2009.01)
*H04W 28/04* (2009.01)
*H04L 1/18* (2006.01)
*H04W 80/02* (2009.01)
*H04B 7/0413* (2017.01)

(52) U.S. Cl.
CPC .......... *H04W 28/04* (2013.01); *H04W 28/06* (2013.01); *H04W 76/15* (2018.02); *H04W 80/02* (2013.01); *H04B 7/0413* (2013.01)

(56) References Cited

U.S. PATENT DOCUMENTS

| | | | | |
|---|---|---|---|---|
| 2007/0140123 | A1* | 6/2007 | Fukui | H04L 47/263 370/235 |
| 2008/0091868 | A1* | 4/2008 | Mizrachi | G06F 13/24 710/263 |
| 2011/0188377 | A1* | 8/2011 | Kim | H04L 49/9021 370/235 |
| 2011/0296064 | A1 | 12/2011 | Ehsan et al. | |
| 2012/0008573 | A1* | 1/2012 | Shiva | H04W 72/1252 370/329 |
| 2013/0028088 | A1* | 1/2013 | Do | H04L 1/1607 370/235 |
| 2015/0215825 | A1* | 7/2015 | Kim | H04W 36/38 370/331 |
| 2016/0056927 | A1 | 2/2016 | Liu et al. | |
| 2018/0070325 | A1* | 3/2018 | Yi | H04L 1/18 |

OTHER PUBLICATIONS

3rd Generation Partnership Project; Technical Specification Group Radio Access Network; Evolved Universal Terrestrial Radio Access (E-UTRA); Medium Access Control (MAC) protocol specification; TS 36.321 V15.0.0; Release 15; Jan. 7, 2018; Valbonne, France.

Qualcomm Incorporated, NR data rates effects on the UE and networks, 3GPP TSG-RAN WG2 Meeting #100, Reno, USA, Nov. 27-Dec. 1, 2017, R2-1713731.

* cited by examiner

APPARATUS AND METHOD FOR PROCESSING PACKETS IN WIRELESS COMMUNICATION SYSTEM

CROSS-REFERENCE TO RELATED APPLICATION(S)

This application is based on and claims priority under 35 U.S.C. § 119 of a Korean patent application number 10-2018-0018831, filed on Feb. 14, 2018, in the Korean Intellectual Property Office, the disclosure of which is incorporated by reference herein in its entirety.

BACKGROUND

1. Field

The disclosure relates to a wireless communication system. More particularly, the disclosure relates to an apparatus and a method for processing packets in a wireless communication system.

2. Description of Related Art

The above information is presented as background information only to assist with an understanding of the disclosure. No determination has been made, and no assertion is made, as to whether any of the above might be applicable as prior art with regard to the disclosure.

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'beyond 4G network' or a 'post long term evolution (LTE) system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional-MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency-shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A base station (BS) may transmit packets to a user equipment (UE) and the UE may process the received packets in a wireless communication system. The UE may store packets in a buffer and make a request for retransmission of packets that have not been normally received. When the number of packets that the UE stores in the buffer increases, the buffer may be overloaded and the speed at which the UE processes the packets may decrease.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for processing packets in a wireless communication system.

Another aspect of the disclosure is to provide an apparatus and method by which a base station (BS) performs transmission control on the basis of a number of packets stored in a buffer of a user equipment (UE) in a wireless communication system.

Another aspect of the disclosure is to provide an apparatus and a method by which a BS performs transmission control on the basis of a processing speed of a processor of the UE in a wireless communication system.

Another aspect of the disclosure is to provide an apparatus and a method for transmitting packets when cell transmission is limited under packet duplication radio bearers in a wireless communication system.

Additional aspects will be set forth in part in the description which follows and, in part, will be apparent from the description, or may be learned by practice of the presented embodiments.

In accordance with an aspect of the disclosure, a method of operating a UE in a wireless communication system is provided. The method includes detecting an occurrence of a first state related to a state of a buffer for a packet data convergence protocol (PDCP) entity, transmitting a request message indicating the occurrence of the first state to a base station (BS), and receiving one or more packets from the BS, based on a transmission control performed based on the request message.

In accordance with another aspect of the disclosure, a method of operating a base station (BS) in a wireless communication system is provided. The method includes receiving a request message indicating an occurrence of a first state related to a state of a buffer of a packet data convergence protocol (PDCP) entity of a user equipment (UE) from the UE, performing a transmission control based on the request message, and transmitting one or more packets to the UE, based on the transmission control.

In accordance with another aspect of the disclosure, an apparatus of a UE in a wireless communication system is provided. The apparatus includes at least one processor configured to detect an occurrence of a first state related to a state of a buffer for a packet data convergence protocol (PDCP) entity, and a transceiver configured to transmit a request message indicating the occurrence of the first state to a base station (BS) and receive one or more packets from the BS based on a transmission control performed based on the request message.

In accordance with another aspect of the disclosure, an apparatus of a base station (BS) in a wireless communication system is provided. The apparatus includes a transceiver configured to receive a request message indicating an occurrence of a first state related to a state of a buffer for a packet data convergence protocol (PDCP) entity of a user equipment (UE) from the UE, and at least one processor configured to perform a transmission control based on the request message and control the transceiver to transmit one or more packets to the UE, based on the transmission control.

An apparatus and a method according to various embodiments of the disclosure can prevent performance deterioration of a UE due to buffer overload by providing information on the state of a buffer of the UE and/or the processing speed of a processor to a BS.

An apparatus and a method according to various embodiments of the disclosure can prevent downlink performance deterioration due to a limit on uplink packet transmission by transmitting, regardless of whether a cell available for a logical channel corresponding to a radio link control (RLC) in a packet duplication radio bearer is activated, a control packet through another activated cell.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
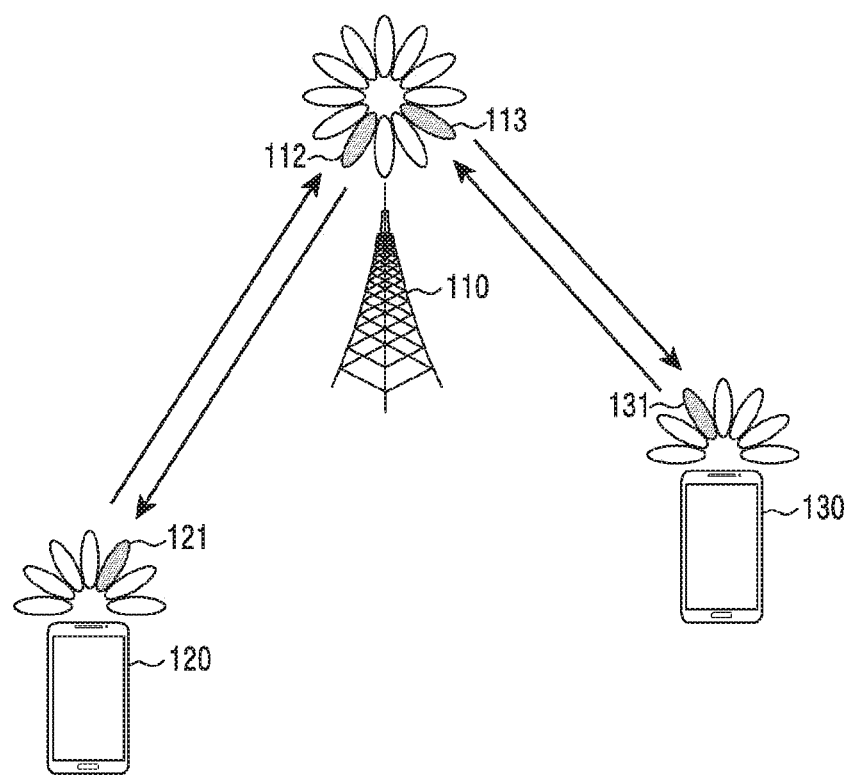
FIG. 1 illustrates a wireless communication system according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Unless defined otherwise, all terms used herein, comprising technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure comprise a technology that uses both hardware and software and thus, the various embodiments of the disclosure may not exclude the perspective of software.

Hereinafter, the disclosure relates to an apparatus and a method for processing packets in a wireless communication system. More particularly, the disclosure describes technology by which a base station (BS) performs transmission control on the basis of the number of packets stored in a buffer of a user equipment (UE) and/or a processing speed of a processor of the UE or transmits packets when cell transmission is limited under a packet duplication radio bearer in a wireless communication system.

The terms referring to a signal used in the following description, the terms referring to a channel, the terms referring to control information, the terms referring to network entities, and the terms referring to elements of a device are used only for convenience of description. Accordingly, the disclosure is not limited to the following terms, and other terms having the same technical meaning may be used.

Further, the disclosure describes various embodiments using the terms used in some communication standards (for example, $3^{rd}$ generation partnership project (3GPP)), but this is only an example. Various embodiments of the disclosure may be easily modified and applied to other communication systems.

FIG. 1 illustrates a wireless communication system according to various embodiments of the disclosure.

Referring to FIG. 1, a base station (BS) 110, a UE 120, and a UE 130 are illustrated as some of the nodes using a wireless channel in a wireless communication system. FIG. 1 illustrates only one BS, but another BS, which is the same as or similar to the BS 110, may be further comprised.

The BS 110 is a network infrastructure element that provides wireless access to the UEs 120 and 130. The BS 110 has coverage defined for a predetermined geographical region based on the distance at which a signal can be transmitted. The BS 110 may be referred to as "access point (AP)", an "evolved node B (eNB)", a "$5^{th}$-generation (5G) node", a "wireless point", a "transmission/reception point (TRP)", or another term having a meaning equivalent thereto, as well as "base station".

Each of the UEs 120 and 130 is a device used by a user, and performs communication with the BS 110 through a wireless channel. Depending on the case, at least one of the UEs 120 or 130 may operate without user involvement. That is, at least one of the UEs 120 or 130 may be a device that performs machine-type communication (MTC), and may not be carried by the user. Each of the UEs 120 and 130 may be referred to as "user equipment (UE)", "mobile station", "subscriber station", "remote UE", "wireless UE", "user device", or other terms having the equivalent technical meaning, as well as "UE".

The BS 110, the UE 120, and the UE 130 may transmit and receive wireless signals in millimeter-wave (mmWave) bands (for example, 28 GHz, 30 GHz, 38 GHz, and 60 GHz). At this time, in order to increase a channel gain, the BS 110, the UE 120, and the UE 130 may perform beamforming. The beamforming may comprise transmission beamforming and reception beamforming. That is, the BS 110, the UE 120, and the UE 130 may assign directivity to a transmission signal and a reception signal. To this end, the BS 110 and the UEs 120 and 130 may select serving beams 112, 113, 121, and 131 through a beam search procedure or beam management procedure. After the serving beams 112, 113, 121, and 131 are selected, communication may be performed through resources having a quasi-co-located (QCL) relationship with resources through which the serving beams 112, 113, 121, and 131 are transmitted.

If the large-scale characteristics of a channel for transmitting symbols on a first antenna port can be inferred from a channel for transmitting symbols on a second antenna port, the first antenna port and the second antenna port may be evaluated to have a QCL relationship therebetween. For example, the large-scale characteristics may comprise at least one of delay spread, Doppler spread, Doppler shift, average gain, average delay, or spatial receiver parameters.

Figure 2:
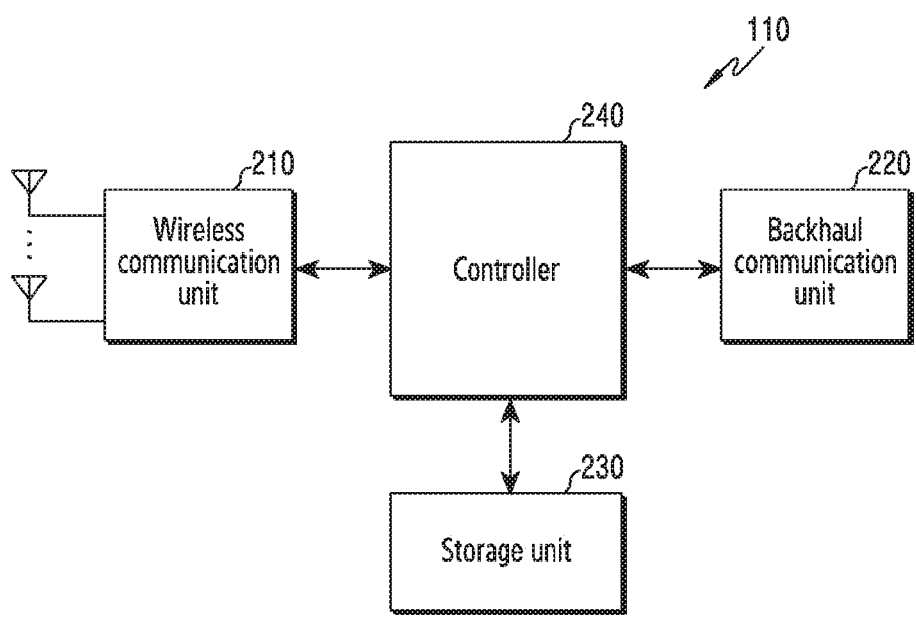
FIG. 2 illustrates the configuration of a base station (BS) in a wireless communication system according to various embodiments of the disclosure.

FIG. 2 illustrates the configuration of a BS in a wireless communication system according to various embodiments of the disclosure. The configuration illustrated in FIG. 2 may be understood as the configuration of the BS 110. The term "~unit" or "~er" used hereinafter may refer to the unit for processing at least one function or operation and may be implemented in hardware, software, or a combination of hardware and software.

Referring to FIG. 2, the BS comprises a wireless communication unit 210, a backhaul communication unit 220, a storage unit 230, and a controller 240 (e.g., at least one processor).

The wireless communication unit 210 performs functions for transmitting and receiving signals through a wireless channel. For example, the wireless communication unit 210 performs a function of conversion between a baseband signal and a bit stream according to the physical layer standard of the system. For example, when data is transmitted, the wireless communication unit 210 generates complex symbols by encoding and modulating a transmission bit stream. Also, when data is received, the wireless communication unit 210 restores a reception bit stream by demodulating and decoding a baseband signal.

The wireless communication unit 210 up-converts a baseband signal into a radio-frequency (RF) band signal and transmits the same through an antenna, and down-converts an RF band signal received through an antenna into a baseband signal. To this end, the wireless communication unit 210 may comprise a transmission filter, a reception filter, an amplifier, a mixer, an oscillator, a digital-to-analog convertor (DAC), an analog-to-digital convertor (ADC), and the like. Further, the wireless communication unit 210 may comprise a plurality of transmission/reception paths. In addition, the wireless communication unit 210 may comprise at least one antenna array consisting of a plurality of antenna elements.

On the hardware side, the wireless communication unit 210 may comprise a digital unit and an analog unit, and the analog unit may comprise a plurality of sub-units according to operation power, operation frequency, and the like. The digital unit may be implemented by at least one processor (for example, a digital signal processor (DSP)).

The wireless communication unit 210 transmits and receives the signal as described above. Accordingly, all or part of the wireless communication unit 210 may be referred to as a "transmitter", a "receiver", or a "transceiver". Also, the transmission and reception performed through a wireless channel, which is described in the following descriptions, may be understood to mean that the above-described processing is performed by the wireless communication unit 210.

The backhaul communication unit 220 provides an interface for performing communication with other nodes within the network. That is, the backhaul communication unit 220 converts a bit stream transmitted from the base station to another node, for example, another access node, another base station, a higher node, or a core network, into a physical signal, and converts a physical signal received from another node into a bit stream.

The storage unit 230 may store data, such as a basic program for operating a base station, an application, configuration information, and the like. The storage unit 230 may be implemented as volatile memory, nonvolatile memory, or a combination of volatile memory and nonvolatile memory. Further, the storage unit 230 provides stored data in response to a request from the controller 240.

The controller 240 controls the general operation of the BS. For example, the controller 240 transmits and receives a signal through the wireless communication unit 210 or the backhaul communication unit 220. Further, the controller 240 records data in the storage unit 230 and reads the recorded data. The controller 240 may perform the functions of a protocol stack required according to communication standards. According to another implementation, the protocol stack may be comprised in the wireless communication unit 210. To this end, the controller 240 may comprise at least one processor.

According to various embodiments, the controller 240 may perform control to receive a request message indicating an occurrence of a first state related to a state of a buffer of a packet data convergence protocol (PDCP) entity of a user equipment (UE) from the UE, perform a transmission control based on the request message, and transmit packets to the UE, based on the transmission control. For example, the controller 240 may control the BS to perform the operations according to various embodiments described below.

Figure 3:
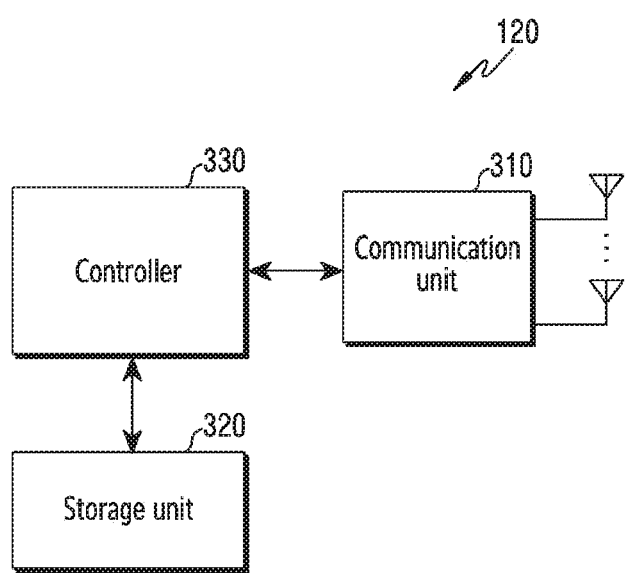
FIG. 3 illustrates the configuration of a user equipment (UE) in a wireless communication system according to various embodiments of the disclosure.

FIG. 3 illustrates the configuration of a UE in a wireless communication system according to various embodiments of the disclosure. The configuration illustrated in FIG. 3 may be understood as the configuration of the UE 120. The term "~unit" or "~er" used hereinafter may refer to the unit for processing at least one function or operation and may be implemented in hardware, software, or a combination of hardware and software.

Referring to FIG. 3, the UE comprises a communication unit 310, a storage unit 320, and a controller 330 (e.g., at least one processor).

The communication unit 310 performs functions for transmitting/receiving a signal through a wireless channel. For example, the communication unit 310 performs a function of conversion between a baseband signal and a bit stream according to the physical layer standard of the system. For example, when data is transmitted, the communication unit 310 generates complex symbols by encoding and modulating a transmission bit stream. Also, when data is received, the communication unit 310 restores a reception bit stream by demodulating and decoding a baseband signal. Also, the communication unit 310 up-converts a baseband signal into an RF band signal and transmits the same through an antenna, and down-converts an RF band signal received through an antenna into a baseband signal. For example, the communication unit 310 may comprise a transmission filter, a reception filter, an amplifier, a mixer, an oscillator, a DAC, an ADC, and the like.

Further, the communication unit 310 may comprise a plurality of transmission/reception paths. In addition, the communication unit 310 may comprise at least one antenna array consisting of a plurality of antenna elements. On the hardware side, the communication unit 310 may comprise a digital circuit and an analog circuit (for example, a radio frequency integrated circuit (RFIC)). The digital circuit and the analog circuit may be implemented as one package. The communication unit 310 may comprise a plurality of RF chains. The communication unit 310 may perform beamforming.

The communication unit 310 transmits and receives the signal as described above. Accordingly, all or some of the communication unit 310 may be referred to as a "transmitter", a "receiver", or a "transceiver". Also, the transmission and reception performed through a wireless channel, which is described in the following descriptions, may be understood to mean that the above-described processing is performed by the communication unit 310.

The storage unit 320 may store data, such as a basic program for the operation of the UE, application configuration information, and the like. The storage unit 320 may be implemented as volatile memory, nonvolatile memory, or a combination of volatile memory and nonvolatile memory. Further, the storage unit 320 provides stored data in response to a request from the controller 330.

The controller 330 controls the overall operation of the UE. For example, the controller 330 transmits and receives a signal through the communication unit 310. Further, the controller 330 records data in the storage unit 320 and reads the recorded data. In addition, the controller 330 may perform the functions of a protocol stack required by the communication standard. To this end, the controller 330 may comprise at least one processor or microprocessor, or may play the part of the processor. Further, the part of the communication unit 310 or the controller 330 may be referred to as a communication processor (CP).

According to various embodiments, the controller 330 may perform control to detect an occurrence of a first state related to a state of a buffer for a packet data convergence protocol (PDCP) entity, transmitting a request message indicating the occurrence of the first state to a base station (BS), and receive packets from the BS, based on a transmission control performed based on the request message. For example, the controller 330 may control the UE to perform the operations described below according to various embodiments.

Figure 4:
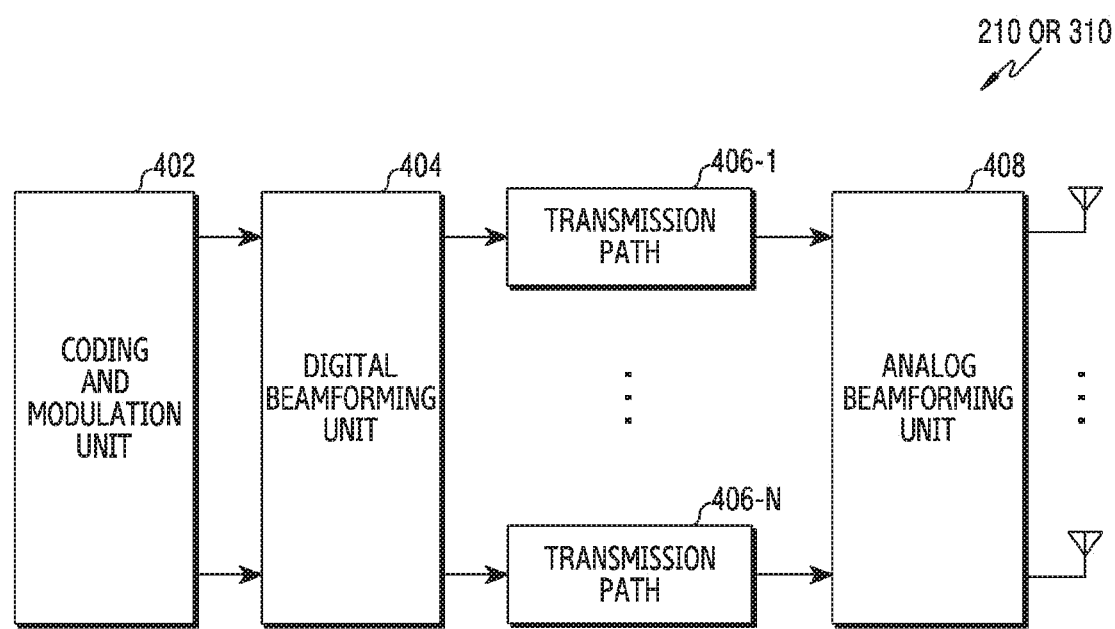
FIG. 4 illustrates the configuration of the communication unit in the wireless communication system according to various embodiments of the disclosure.

FIG. 4 illustrates the configuration of the communication unit in the wireless communication system according to various embodiments of the disclosure. FIG. 4 illustrates an example of the detailed configuration of the wireless communication unit 210 of FIG. 2 or the communication unit 310 of FIG. 3. Specifically, FIG. 4 illustrates elements for performing beamforming as part of the wireless communication unit 210 of FIG. 2 or the communication unit 310 of FIG. 3.

Referring to FIG. 4, the wireless communication unit 210 or the communication unit 310 comprises a coding and modulation unit 402, a digital beamforming unit 404, a plurality of transmission paths 406-1 to 406-N, and an analog beamforming unit 408.

The coding and modulation unit 402 performs channel encoding. For the channel encoding, at least one of a low-density parity check (LDPC) code, a convolution code, or a polar code may be used. The encoding and modulation unit 402 generates modulation symbols by performing constellation mapping.

The digital beamforming unit 404 performs beamforming for a digital signal (for example, modulation symbols). To this end, the digital beamforming unit 404 multiplies the modulation symbols by beamforming weighted values. The beamforming weighted values may be used for changing the size and phase of the signal, and may be referred to as a "precoding matrix" or a "precoder". The digital beamforming unit 404 outputs the digitally beamformed modulation symbols to the plurality of transmission paths 406-1 to 406-N. At this time, according to a multiple-input multiple-output (MIMO) transmission scheme, the modulation symbols may be multiplexed, or the same modulation symbols may be provided to the plurality of transmission paths 406-1 to 406-N.

The plurality of transmission paths 406-1 to 406-N converts the digitally beamformed digital signals into analog signals. To this end, each of the plurality of transmission paths 406-1 to 406-N may comprise an inverse fast fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier (FBMC)) is applied. That is, the plurality of transmission paths 406-1 to 406-N provides independent signal-processing processes for a plurality of streams generated through the digital beamforming. However, depending on the implementation, some of the elements of the plurality of transmission paths 406-1 to 406-N may be used in common.

The analog beamforming unit 408 performs beamforming on analog signals. To this end, the digital beamforming unit 404 multiplies the analog signals by beamforming weighted values. The beamformed weighted values are used to change the size and phase of the signal.

Figure 5A:
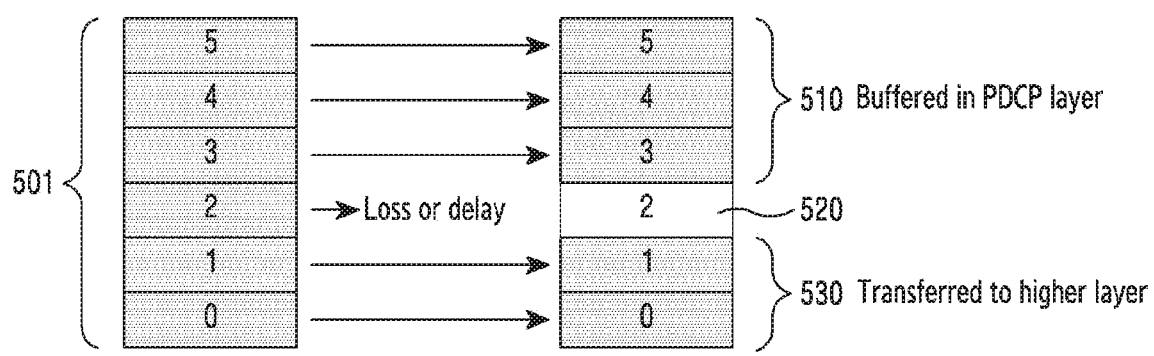
FIGS. 5A and 5B illustrate a buffer state on a packet data convergence protocol (PDCP) layer of the UE (for example, the UE 120) in a wireless communication system according to various embodiments of the disclosure.
Figure 5B:
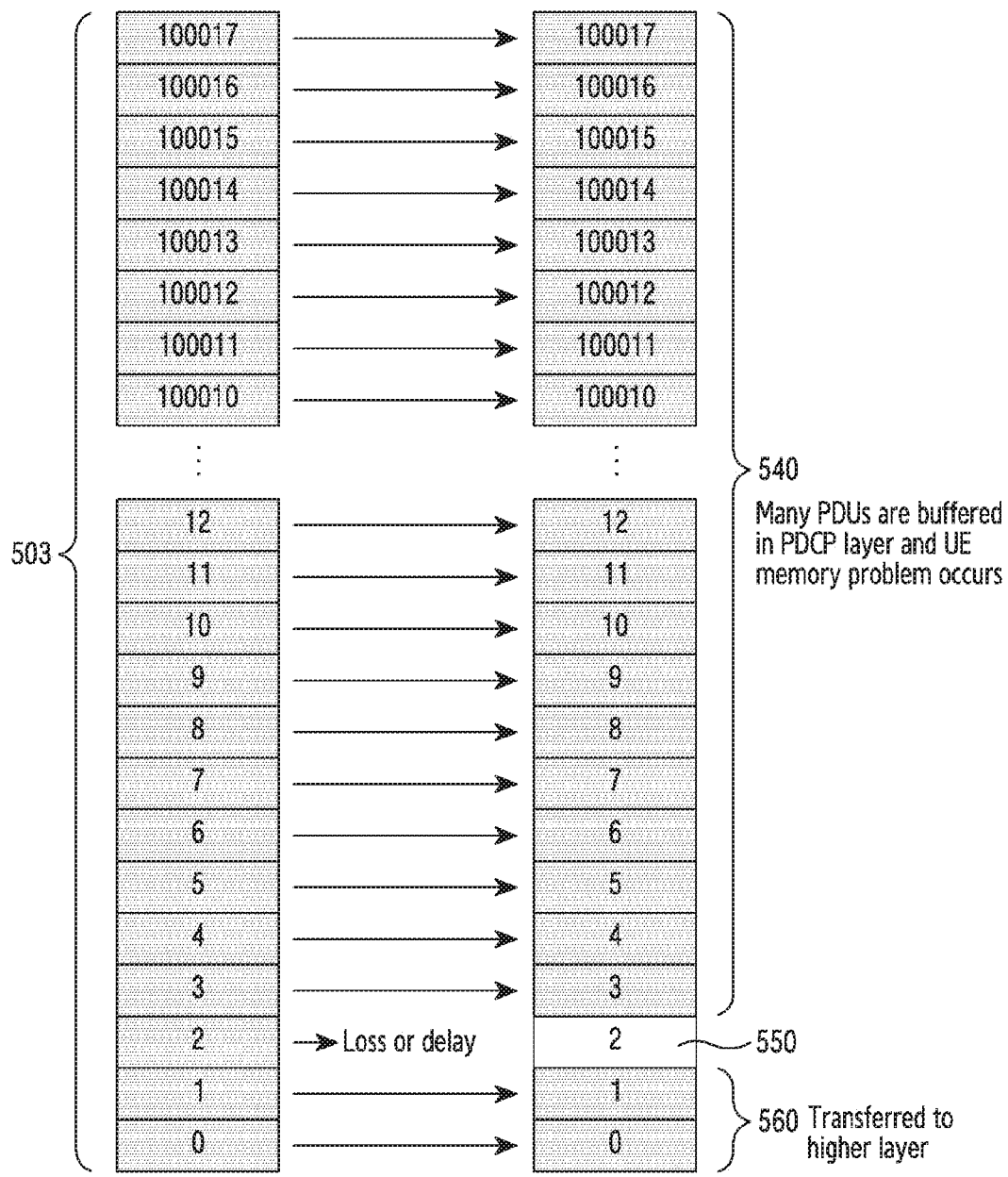

FIGS. 5A and 5B illustrate a buffer state in a packet data convergence protocol (PDCP) layer of the UE (for example, the UE 120) in a wireless communication system according to various embodiments of the disclosure.

The UE (for example, the UE 120) may reorder sequences of packets according to sequence numbers (SN) of PDCP service data units (SDU) on the PDCP layer (or the PDCP entity) and transfer the reordered packets to a higher layer. The reordering procedure may be performed to prevent a problem from occurring in the operation on an application layer since a packet generated and transmitted later by a transmitting side (for example, the BS 110) is first processed by a receiving side (for example, the UE 120).

Referring to FIG. 5A, it is assumed that a transmission device (for example, the BS 110) transmits packets (501) having sequence numbers 0 to 5 (that is, packet 0 to packet 5) and that a reception device (for example, the UE 120) receives packets in the order of packet 0, packet 1, packet 3, packet 4, and packet 5 because the packet (that is, packet 2) having sequence number 2 (520) has been lost and/or delayed. In this case, packet 0 and packet 1 (530) can be transferred to a higher layer, but packet 3, packet 4, and packet 5 (510) may not be transmitted to the higher layer, but may be stored in a buffer in the PDCP layer. The buffer for storing the packets may be physically comprised in the PDCP entity or comprised in a common storage space within a UE processor according to an embodiment.

Referring to FIG. 5B, it is assumed that the transmission device (for example, the BS 110) transmits packets 0 to packet 100017 (503) and that the reception device sequentially receives the remaining packets (540 and 560) except for packet 2 (550), among the transmitted packets, due to the loss and/or delay of packet 2 (550). Referring to FIG. 5B, since packet 2 (550) has not arrived at the reception device, all of packet 3 to packet 100017 (540) may be stored in the buffer in the PDCP layer. However, when many packets are stored in the buffer without being processed, as illustrated in FIG. 5B, the reception device may encounter a memory capacity problem.

Figure 6:
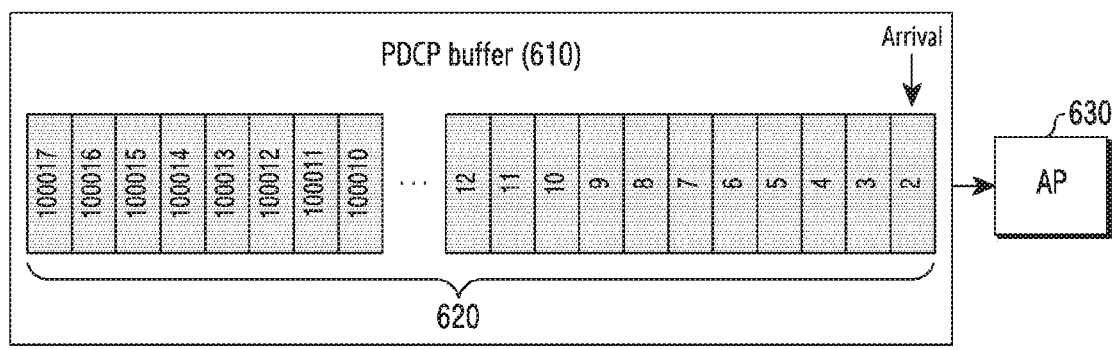
FIG. 6 illustrates the transmission of packets from a PDCP buffer to an application processor in a wireless communication system according to various embodiments of the disclosure.

FIG. 6 illustrates the transmission of packets from a PDCP buffer to an application processor in a wireless communication system according to various embodiments of the disclosure.

Referring to FIG. 6, as illustrated with reference to FIG. 5B, when packet 2 arrives at the UE (for example, the UE 120) in the state in which many packets (packets 3 to 100017) are stored in the buffer 610, the PDCP entity of the UE may simultaneously transfer all of packets 2 to 100017 (620) to the application processor (AP) 630 of the UE. In this case, the number of packets that the AP needs to process may rapidly increase. However, the processing speed of the AP is limited and may vary over time, so that the simultaneous arrival of many packets at the AP may cause AP overload or a decrease in the processing speed of the AP.

Figure 7:
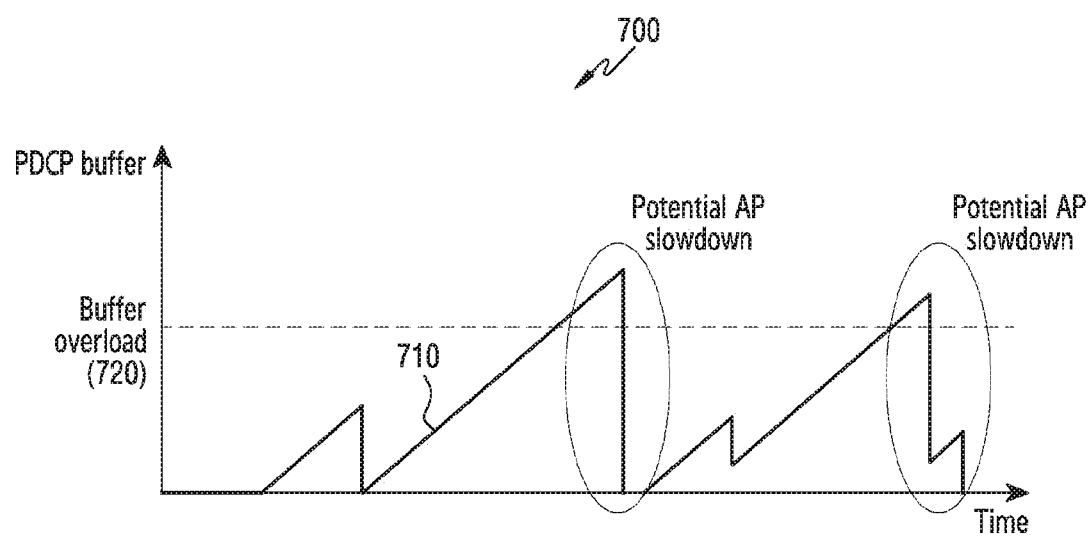
FIG. 7 is a graph showing a change in the number of packets stored in a buffer for a PDCP entity in a wireless communication system according to various embodiments of the disclosure.

FIG. 7 is a graph 700 showing a change in the number of packets stored in the buffer for the PDCP entity in a wireless communication system according to various embodiments of the disclosure. The buffer for the PDCP entity may be physically comprised in the PDCP entity, or may be comprised in a common storage space within the UE processor according to an embodiment.

Referring to FIG. 7, as described with reference to FIGS. 5A, 5B, and 6, when the packets cannot be transferred to the higher layer (for example, a service data application protocol (SDAP) layer) or the AP by reordering, the packets may be stored in the buffer for the PDCP entity. According to the graph 700, the number 710 of packets stored in the buffer for the PDCP entity may exceed a buffer overload level 720. The buffer overload level 720 refers to a threshold value for the number of packets stored in the buffer, by which the buffer is overloaded. For example, when the number of packets stored in the buffer exceeds the buffer overload level, it is determined that the buffer is overloaded.

When the number of packets stored in the buffer exceeds the buffer overload level, there is the possibility of slowdown of the AP of the UE due to the packets stored in the buffer. Hereinafter, in the disclosure, the possibility of slowdown of the AP of the UE may be referred to as "potential slowdown" or "potential AP slowdown". According to the graph 700, the potential slowdown may occur whenever the number 710 of packets stored in the buffer exceeds the buffer overload level 720.

Figure 8:
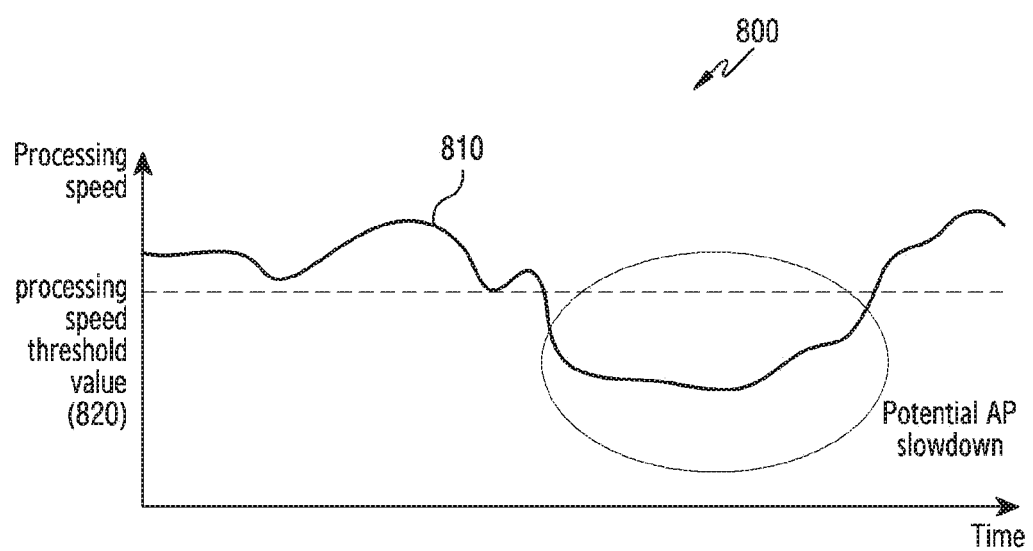
FIG. 8 is a graph showing a change in the processing speed of an application processor (AP) of the UE in a wireless communication system according to various embodiments of the disclosure.

FIG. 8 is a graph 800 showing a change in the processing speed of the AP of the UE in a wireless communication system according to various embodiments of the disclosure. The processing speed 810 of the UE AP may be the speed of a microprocessor for processing data related to the UE, and the microprocessor may comprise at least one of the AP or a communication processor (CP) of the UE.

Referring to FIG. 8, the microprocessor may share calculation processing with a plurality of applications, and the processing speed at which the UE processes PDCP packets may be changed by a change in the processing speed required by applications. Accordingly, as shown in the graph 800, the processing speed 810 of the UE AP may decrease below a processing speed threshold value 820. When the processing speed of the microprocessor is equal to or lower than a preset threshold value (for example, the processing speed threshold value 820), or when the AP should simultaneously process many packets, as illustrated in FIG. 6, the speed of the AP may decrease.

Figure 9:
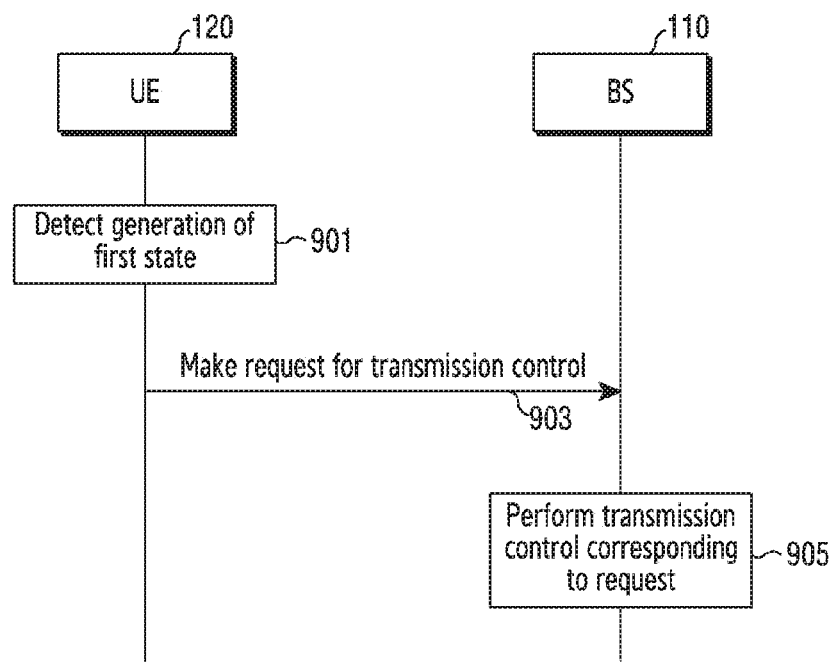
FIG. 9 illustrates signal flow between the BS and the UE for the transmission control in a wireless communication system according to various embodiments of the disclosure.

FIG. 9 illustrates a signal flow between the BS and the UE for transmission control in a wireless communication system according to various embodiments of the disclosure. FIG. 9 shows signal flow between the BS 110 and the UE 120.

Referring to FIG. 9, in operation 901, the UE detects the occurrence of a first state. The first state may pertain to the state of the buffer for the PDCP entity. For example, the first state may be a state in which it is expected that the number of packets stored in the buffer for the PDCP entity exceeds the buffer overload level, as illustrated in FIG. 7, or the state in which it is expected that the processing speed of the AP is lower than the processing speed threshold value as many packets in the buffer of the PDCP entity are transferred to the AP, as illustrated in FIG. 8.

In operation 903, the UE transmits a message that makes a request for transmission control to the BS. The transmission control may comprise at least one of control of a transmission time point, control of a retransmission time point, control of a transmission speed, or control of a retransmission speed. The message transmitted in operation 902 may comprise an indicator indicating the occurrence of the first state.

In operation 905, the BS performs transmission control in response to the request received in operation 903. In other words, the BS may control the transmission time point, the retransmission time point, the transmission speed, the retransmission speed, or a combination of at least two thereof in response to the request. Although not illustrated, when the first state is released, the BS may perform the operations that were performed for the UE before the transmission control. The state in which the first state is released may be referred to as a second state. The second state may be a state in which it is expected that the number of packets stored in the buffer for the PDCP entity does not exceed the buffer overload level or a state in which it is expected that the processing speed of the AP is not lower than the processing speed threshold value.

Figure 10:
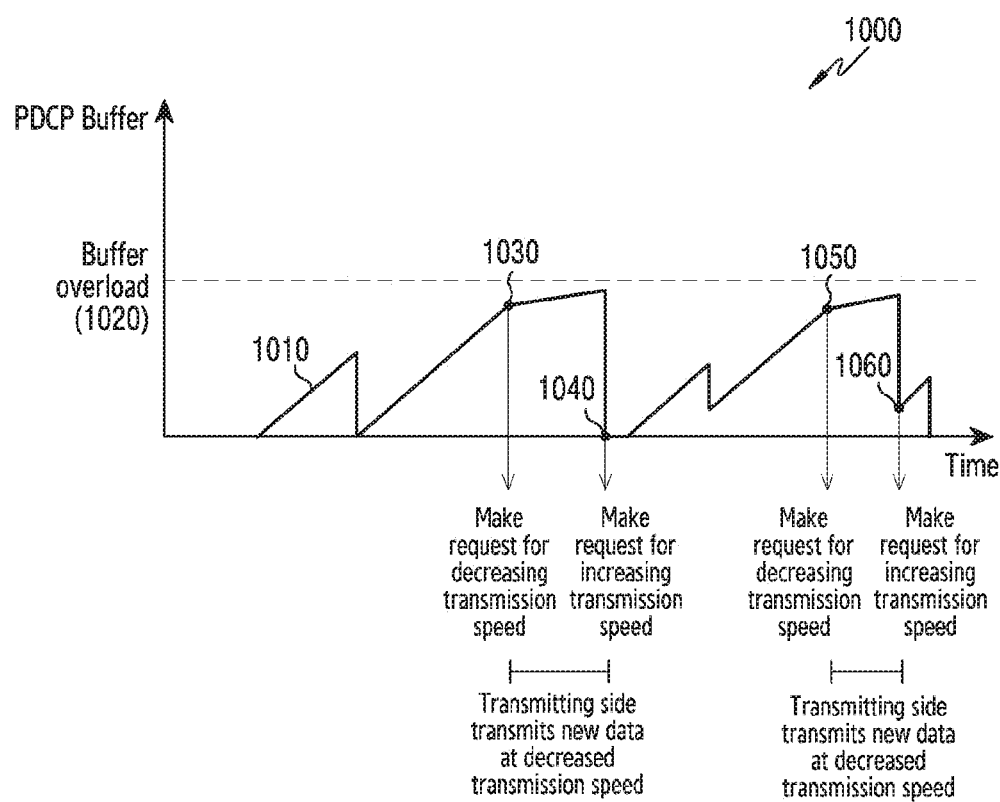
FIG. 10 is a graph showing a change in the number of packets stored in the buffer for the PDCP entity on the basis of transmission speed control in a wireless communication system according to various embodiments of the disclosure.

FIG. 10 is a graph 1000 showing a change in the number of packets stored in the buffer for the PDCP entity according to transmission speed control in a wireless communication system according to various embodiments of the disclosure.

Referring to FIG. 10, when it is expected that the number of packets 1010 stored in the buffer for the PDCP entity will exceed a buffer overload level 1020, the UE may transmit a transmission speed decrease request 1030 to the BS. In the disclosure, the transmission speed decrease request is a request to decrease the speed at which the BS transmits downlink packets to the UE. A first transmission control threshold value, lower than the buffer overload level 1020, may be set. When the UE determines that the number of packets stored in the buffer for the PDCP entity exceeds the first transmission control threshold value, the UE may expect that the number of packets stored in the buffer for the PDCP entity will exceed the buffer overload level 1020. In other words, the first transmission control threshold value may be a threshold value of the number of packets stored in the buffer for making a request to decrease the transmission control by the UE. When the BS receives the transmission speed decrease request 1030 from the UE, the BS may prevent buffer overload of the UE by controlling the transmission speed of packets transmitted to the UE. For example, the BS may decrease the transmission speed of the packets transmitted to the UE such that the packets are sufficiently processed in the buffer for the PDCP entity of the UE in response to the transmission speed decrease request 1030. According to the decrease in the transmission speed, after completing recording of the PDCP packets, the UE may transmit packets to a higher layer or to the AP, and the number of packets stored in the buffer for the PDCP entity of the UE may decrease. When the number of packets stored in the buffer has sufficiently decreased, the UE may transmit a transmission speed increase request 1040 to the BS. In the disclosure, the transmission speed increase request is a request to increase the speed at which the BS transmits downlink packets to the UE. When the BS receives the transmission speed increase request 1040 from the UE, the BS may increase the transmission speed of packets transmitted to the UE. Thereafter, the UE may transmit a transmission speed decrease request 1050 and/or a transmission speed increase request 1060 according to the state of the buffer for the PDCP entity.

According to various embodiments of the disclosure, the transmission speed decrease request may be transmitted when the number of packets stored in the buffer for the PDCP entity exceeds the first transmission control threshold value, and the transmission speed increase request may be transmitted when the number of packets stored in the buffer for the PDCP entity is lower than the second transmission control threshold value. The second transmission control threshold value may be the threshold value of the number of packets stored in the buffer that makes a request to increase the transmission control.

Figure 11:
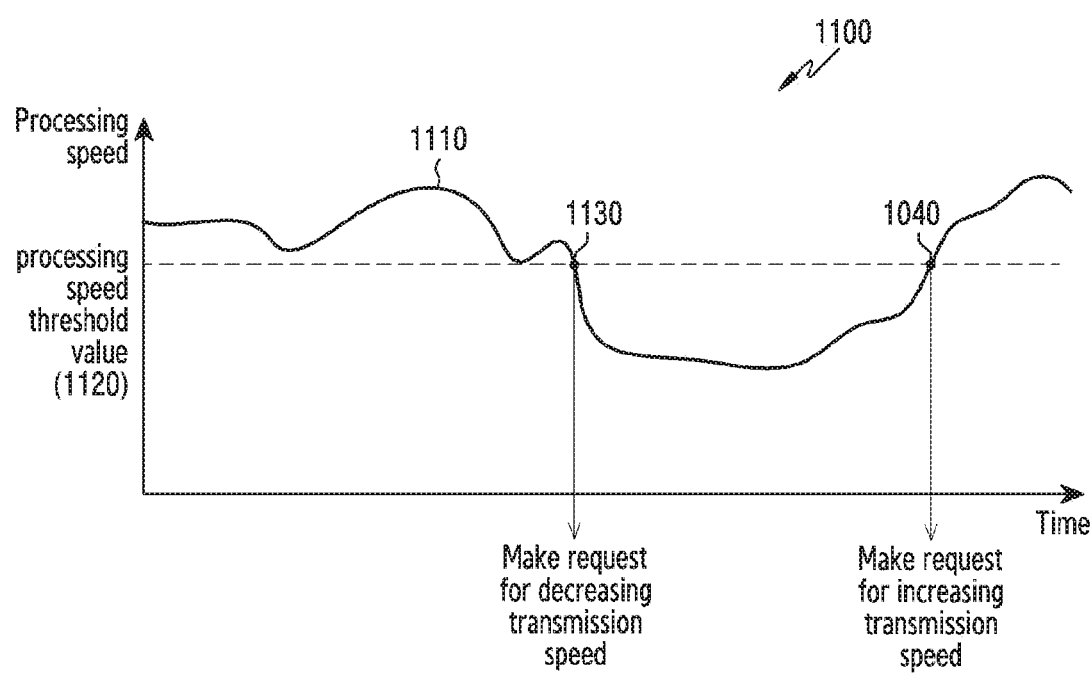
FIG. 11 is a graph showing a change in the processing speed of the UE AP on the basis of transmission speed control in a wireless communication system according to various embodiments of the disclosure.

FIG. 11 is a graph 1100 showing a change in the processing speed (e.g., 1110) of the UE AP based on the transmission speed control in a wireless communication system according to various embodiments of the disclosure.

Referring to FIG. 11, when it is expected that the processing speed of the AP of the UE is lower than a processing speed threshold value 1120, the UE may transmit a transmission speed decrease request 1130 to the BS. A third transmission control threshold value larger than or equal to the processing speed threshold value 1120 may be set. When the UE determines that the processing speed of the AP is lower than the third transmission control threshold value, the UE may expect that the processing speed of the AP of the UE will be lower than the processing speed threshold value 1120. In other words, the third transmission control threshold value may be the threshold value of the processing speed of the AP of the UE making the request to decrease the transmission speed. When the BS receives the transmission speed decrease request 1130 from the UE, the BS may prevent the decrease in the processing speed of the UE AP by controlling the transmission speed of packets transmitted to the UE. For example, the BS may decrease the transmission speed of packets transmitted to the UE such that the packets are properly processed in the AP of the UE in response to the transmission speed decrease request 1130. When the transmission speed of the AP exceeds a fourth transmission control threshold value, the UE may transmit a transmission speed increase request 1140 to the BS. The fourth transmission control threshold value may be the threshold value of the processing speed of the AP of the UE for the request from the UE to increase the transmission speed. When the BS receives the transmission speed increase request 1140 from the UE, the BS may increase the transmission speed of packets transmitted to the UE.

According to various embodiments of the disclosure, the transmission speed decrease request may be transmitted when the processing speed of the UE AP is lower than the third transmission control threshold value, and the transmission speed increase request may be transmitted when the processing speed of the UE AP is higher than the fourth transmission control threshold value. The third transmission control threshold value and the fourth transmission control threshold value may be the same value.

Figure 12:
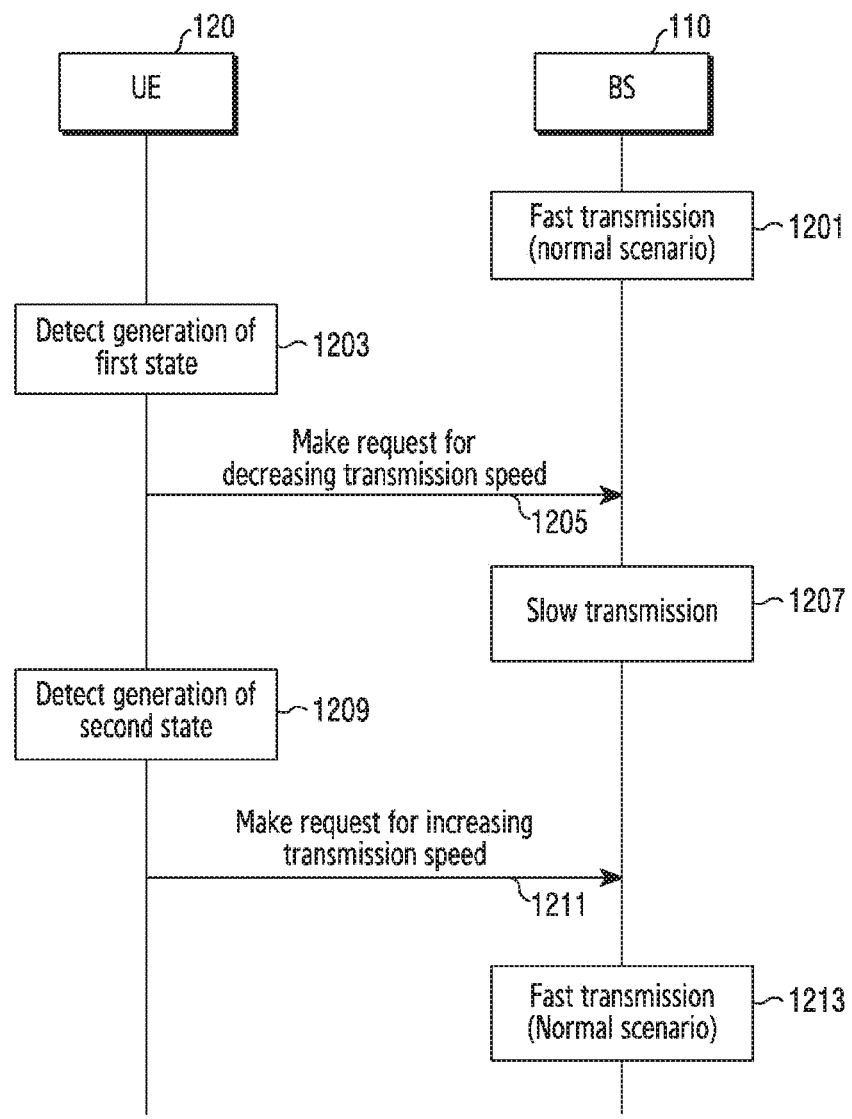
FIG. 12 illustrates a signal flow between the BS and the UE for controlling the transmission speed in a wireless communication system according to various embodiments of the disclosure.

FIG. 12 illustrates a signal flow between the BS and the UE for controlling the transmission speed in a wireless communication system according to various embodiments of the disclosure. FIG. 12 shows a signal flow between the BS 110 and the UE 120.

Referring to FIG. 12, in operation 1201, the BS performs fast transmission to the UE. "Fast" refers to a relative transmission speed, and corresponds to a default transmission speed in a normal scenario.

In operation 1203, the UE detects the occurrence of a first state. The first state may pertain to the state of the buffer for the PDCP entity. For example, the first state may be a state in which it is expected that the number of packets stored in the buffer for the PDCP entity exceeds the buffer overload level, as illustrated in FIG. 7, or a state in which it is expected that the processing speed of the AP is lower than the processing speed threshold value since many packets in the buffer of the PDCP entity are transferred to the AP as illustrated in FIG. 8.

In operation 1205, the UE transmits a transmission speed decrease request to the BS. The transmission speed decrease request may comprise an indicator indicating the occurrence of the first state.

In operation 1207, the BS performs slow transmission. "Slow" refers to a relative transmission speed, and corresponds to a transmission speed slower than the default transmission speed. The BS may decrease the transmission speed of packets transmitted to the UE, and, accordingly, prevent overload of the buffer for the PDCP entity of the UE or prevent a potential slowdown of the AP.

In operation 1209, the UE detects the occurrence of a second state. The second state may be a state in which the first state is released. For example, the second state may be a state in which it is expected that the number of packets stored in the buffer for the PDCP entity does not exceed the buffer overload level or a state in which it is expected that the processing speed of the AP is not lower than the processing speed threshold value. The UE may detect the occurrence of the second state as a result of the slow transmission by the BS.

In operation 1211, the UE transmits a transmission speed increase request to the BS. The transmission speed increase request may comprise an indicator indicating the occurrence of the second state.

In operation 1213, the BS performs fast transmission to the UE. The BS may determine that the first state is released for the UE according to the transmission speed increase request and perform the fast transmission to the UE.

Figure 13:
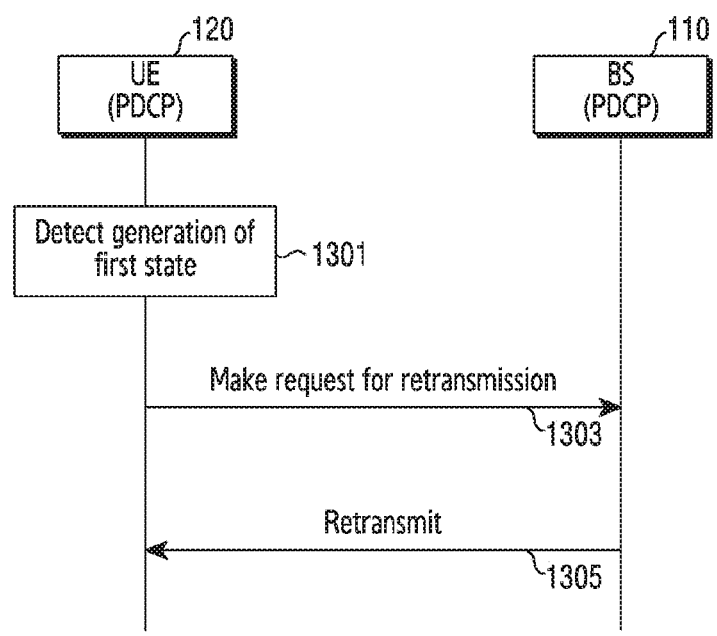
FIG. 13 illustrates a signal flow between the BS and the UE to controlling a retransmission time point in a wireless communication system according to various embodiments of the disclosure.

FIG. 13 illustrates a signal flow between the BS and the UE to control a retransmission time point in a wireless communication system according to various embodiments of the disclosure. FIG. 13 shows a signal flow between the BS 110 and the UE 120.

Referring to FIG. 13, in operation 1301, the UE detects the occurrence of a first state. The first state may pertain to the state of the buffer for the PDCP entity. For example, the first state may be a state in which it is expected that the number of packets stored in the buffer for the PDCP entity exceeds the buffer overload level, as illustrated in FIG. 7, or a state in which it is expected that the processing speed of the AP will be lower than the processing speed threshold value, since many packets in the buffer of the PDCP entity are transferred to the AP as illustrated in FIG. 8.

In operation 1303, the UE makes a request for retransmission to the BS. For example, the UE determines that the first state is generated since packets are not processed in the buffer for the PDCP entity due to a lost packet or a delayed packet, and make a request for retransmission of the lost packet or the delayed packet to the BS. The retransmission request may comprise an indicator indicating the occurrence of the first state. Further, the retransmission request may comprise information indicating a sequence number of the lost packet or the delayed packet.

In operation 1305, the BS performs retransmission to the UE. For example, the BS may control the retransmission time point in response to the retransmission request received from the UE and perform the retransmission of the lost packet or the delayed packet at the controlled retransmission time point. The controlled retransmission time point may be a time point preceding the original retransmission time point. In response to the reception of the lost packet or the delayed packet, the UE may reorder the packets in the buffer for the PDCP entity and transfer the reordered packets to a higher layer and/or the AP.

Figure 14:
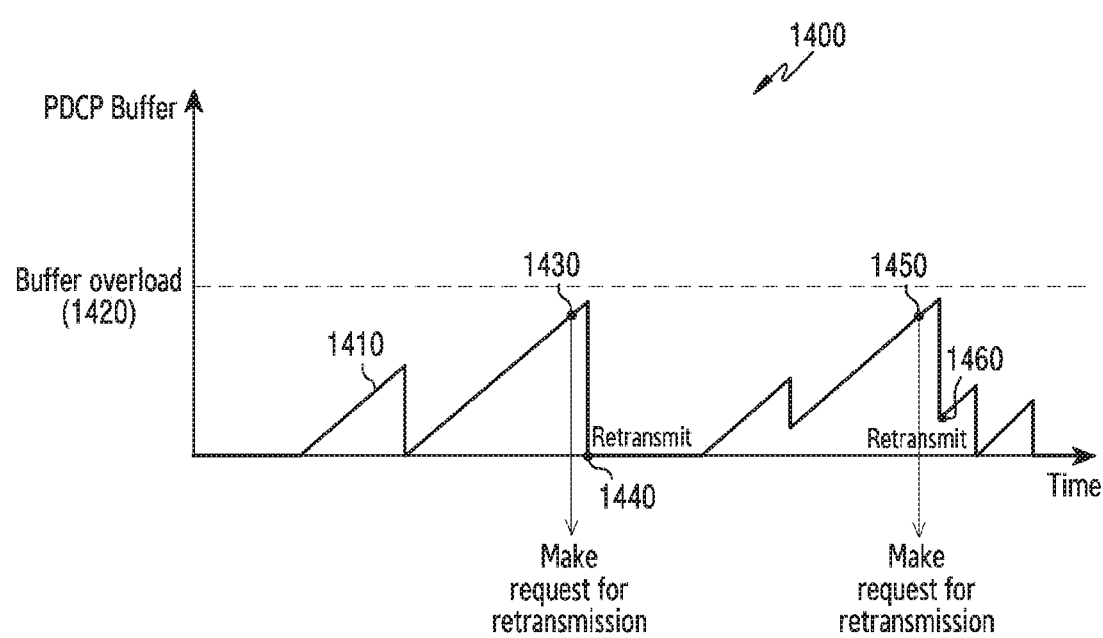
FIG. 14 is a graph showing a change in the number of packets stored in the buffer for the PDCP entity on the basis of retransmission in a wireless communication system according to various embodiments of the disclosure.

FIG. 14 is a graph 1400 showing a change in the number of packets stored in the buffer for the PDCP entity due to retransmission in a wireless communication system according to various embodiments of the disclosure.

Referring to FIG. 14, when it is expected that the number 1410 of packets stored in the buffer for the PDCP entity exceeds a buffer overload level 1420, the UE may transmit a retransmission request 1430 to the BS. For example, the UE may determine that the number 1410 of packets stored in the buffer exceeds the buffer overload level 1420 since the packets have not been processed in the buffer for the PDCP entity due to the lost packet or the delayed packet, and may make a request for retransmission 1430 of the lost packet or the delayed packet to the BS. The BS receiving the retransmission request 1430 may control the retransmission time point and perform retransmission 1440 of the lost packet or the delayed packet at the controlled retransmission time point. The controlled retransmission time point may be a time point preceding the original retransmission time point. According to the reception of the lost packet or the delayed packet, the UE may reorder the packets in the buffer for the PDCP entity and transfer the reordered packets to a higher layer and/or the AP so as to prevent the buffer overload. Thereafter, when the buffer overload is expected, the UE may transmit a retransmission request 1450 and receive retransmission 1460.

According to various embodiments of the disclosure, when the number 1410 of packets stored in the buffer for the PDCP entity exceeds a fifth transmission control threshold value, the UE may determine that a buffer overload will occur and transmit a retransmission request to the BS. The fifth transmission control threshold value may be the same as or different from the first transmission control threshold value. The retransmission request transmitted to the BS may be a status report or a status protocol data unit (PDU) message of a PDCP layer and/or a radio link control d) layer.

Figure 15:
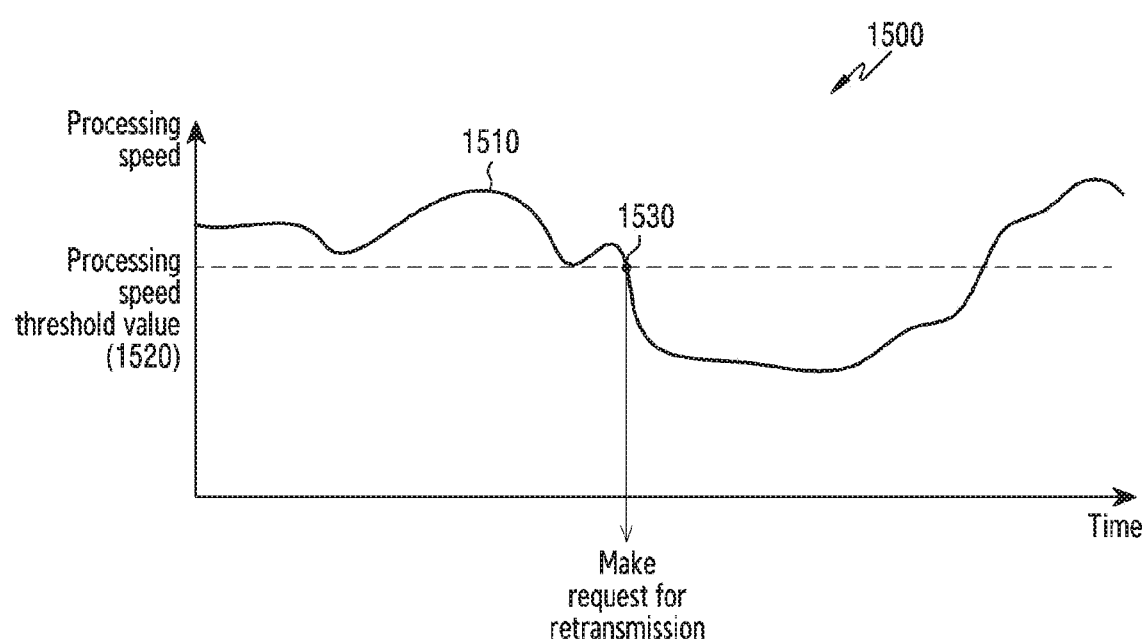
FIG. 15 is a graph showing a change in the processing speed of the UE AP on the basis of retransmission in a wireless communication system according to various embodiments of the disclosure.

FIG. 15 is a graph 1500 showing a change in the processing speed of the UE AP due to retransmission in a wireless communication system according to various embodiments of the disclosure.

Referring to FIG. 15, when it is expected that a processing speed 1510 of the UE AP will decrease, the UE may transmit a retransmission request 1530 to the BS. For example, the UE may determine that the processing speed 1510 of the AP becomes lower than a processing speed threshold value 1520 due to the lost packet or the delayed packet, and may make a request for retransmitting the lost packet or the delayed packet to the BS. The BS receiving the retransmission request 1530 may control a retransmission time point and retransmit the lost packet or the delayed packet at the controlled retransmission time point. The controlled retransmission time point may be a time point preceding the original retransmission time point. According to the reception of the lost packet or the delayed packet, the UE may reorder the packets in the buffer for the PDCP entity and transfer the reordered packets to a higher layer and/or the AP so as to prevent a decrease in the AP processing speed.

According to various embodiments of the disclosure, when the processing speed 1510 of the AP is lower than a sixth transmission control threshold value, the UE may determine that the processing speed of the AP will decrease and transmit a retransmission request to the BS. The sixth transmission control threshold value may be the same as or different from the third transmission control threshold value. The retransmission request transmitted to the BS may be a status report or a status PDU message of a PDCP layer and/or RLC layer.

Figure 16:
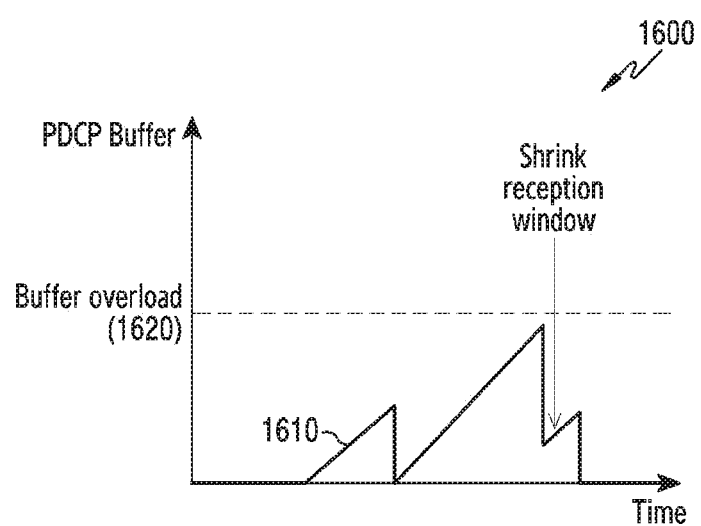
FIG. 16 is a graph showing the number of packets stored in the buffer for the PDCP entity of the UE on the basis of shrinkage of a reception window in a wireless communication system according to various embodiments of the disclosure.

FIG. 16 is a graph 1600 showing the number of packets stored in the buffer for the PDCP entity of the UE with respect to shrinking of reception widows in a wireless communication system according to various embodiments of the disclosure.

Referring to FIG. 16, according to various embodiments of the disclosure, when it is expected that the number 1610 of packets stored in the buffer for the PDCP entity exceeds a buffer overload level 1620, the UE may shrink a reception window. When the reception window of the UE is shrunk, the maximum number of packets that can be stored in the buffer decreases, so that the number 1610 of packets stored in the buffer may decrease.

In order to decrease the reception window, the UE may transmit a message indicating a change in the reception window to the BS. The BS may perform packet transmission on the basis of the change in the reception window of the UE. For example, the BS may change the size of the transmission window to the size of the changed reception window and transmit packets to the UE through the changed transmission window.

According to various embodiments of the disclosure, when the number 1610 of packets stored in the buffer for the PDCP entity exceeds the first transmission control threshold value and/or the fifth transmission control threshold value, the UE may determine that a buffer overload will occur and instruct the BS to change the reception window or transmit a message making a request to change the window.

In another example, when the transmission speed of the UE AP is lower than the third transmission control threshold value and/or the sixth transmission control threshold value, the UE may determine that the processing speed of the AP will decrease and transmit a message indicating a change in the reception window to the BS.

Figure 17:
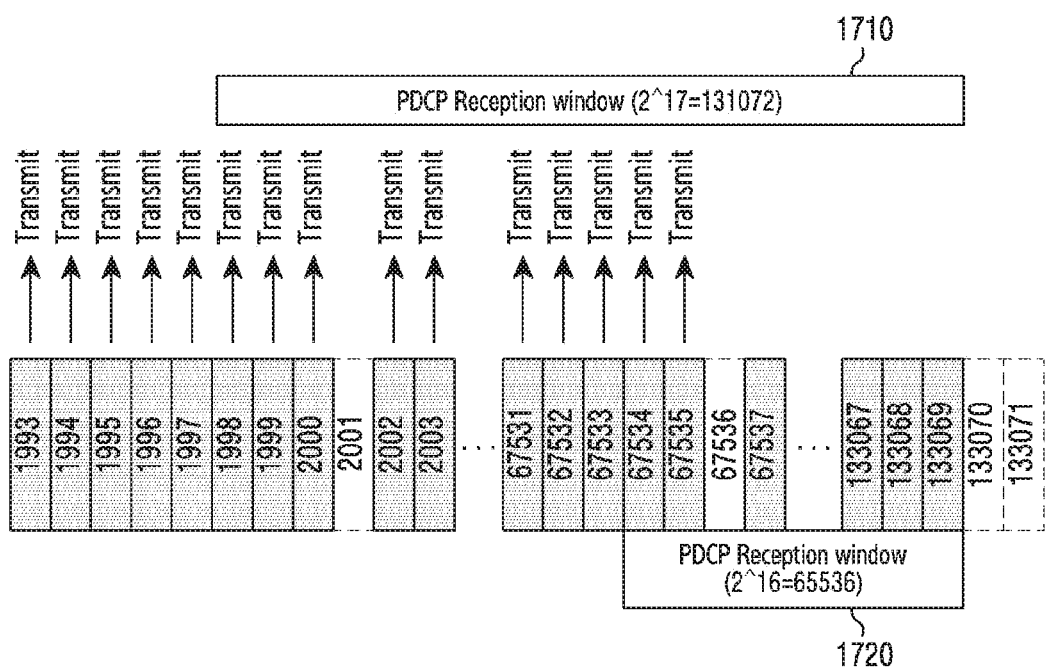
FIG. 17 illustrates operations by a change of the reception window in a wireless communication system according to various embodiments of the disclosure.

FIG. 17 illustrates operations pertaining to the reception window change in a wireless communication system according to various embodiments of the disclosure.

Referring to FIG. 17, it is assumed that the size of a reception window 1710 of the UE before a change of the reception window (or the PDCP reception window) is $2^{17}=131072$, and that packet 2001, packet 67536, packet 133070, and packets, having the next sequence numbers, have not been received. In this case, since packet 2001 has not been received, the UE stores packet 2002 and all subsequent packets in the buffer for the PDCP entity. As illustrated in FIG. 17, a total of 131067 packets are stored in the buffer, so that a potential slowdown may occur. However, when the size of the reception window is shrunk to $2^{16}=65536$, the potential slowdown may not occur. At this time, the size of the reception window may be controlled such that an upper portion of the reception window, that is, a highest sequence number of the reception window, is not changed, and a lower portion of the reception window, that is, a lowest sequence number of the reception window, may be changed. That, is sequence numbers from 67534 to 133069 become the range of the reception window. After the change of the reception window, packets from sequence number 2002 to sequence number 67533, which are not comprised in the reception window 1720, may be transmitted to a higher layer or the AP, or may be discarded from the PDCP layer. The packets transmitted to the higher layer or the AP or discarded from the PDCP layer may be determined on the basis of the type of traffic or set by the BS in order to minimize performance deterioration. Thereafter, packets of sequence numbers 67534 and 67535, which have been completely reordered from the lower portion of the reception window 1720, may be transmitted to the higher layer or the AP.

Figure 18:
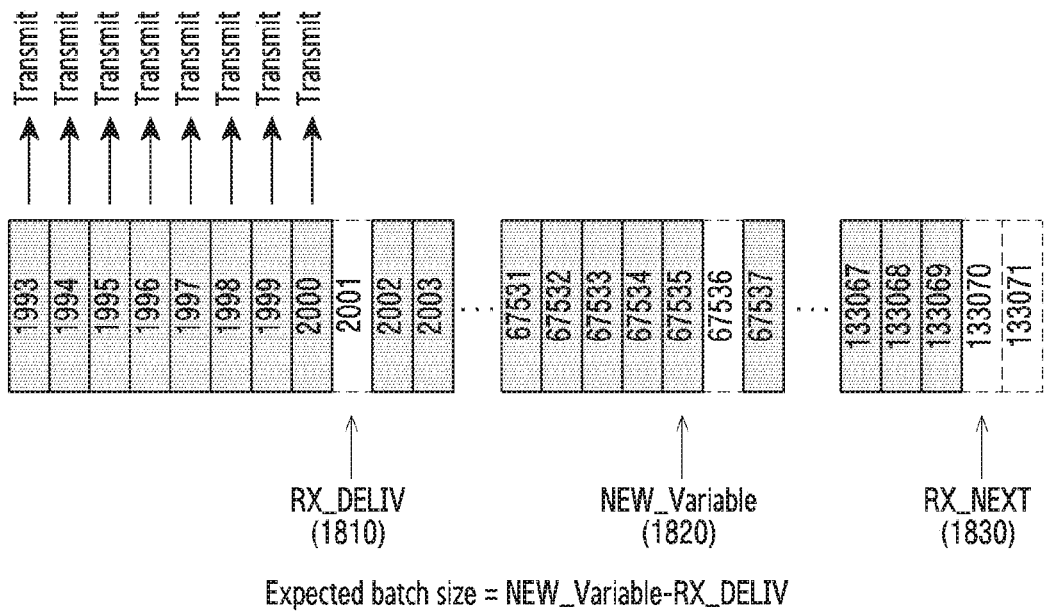
FIG. 18 illustrates a procedure of determining the size of an expected batch in a wireless communication system according to various embodiments of the disclosure.

FIG. 18 illustrates a procedure of determining the size of an expected batch in a wireless communication system according to various embodiments of the disclosure.

Referring to FIG. 18, according to various embodiments of the disclosure, when the number of packets simultaneously transmitted to the higher layer or the AP is large, the AP processing speed may decrease. Accordingly, it is required to determine the number of packets simultaneously transmitted to the higher layer or the AP. According to various embodiments of the disclosure, the number of packets simultaneously transmitted to the higher layer or the AP may be defined as an "expected batch size". In order to determine the expected batch size, a parameter NEW_VARIABLE 1820 and a parameter RX_DELIV 1810 of the PDCP layer may be used. According to various embodiments of the disclosure, RX_DELIV 1810 may be a value generated by adding 1 to a PDCP COUNT value of the packet transmitted to the higher layer or the AP. When the packet corresponding to RX_DELIV 1810 is successfully received, NEW_VARIABLE 1820 may be defined as a highest PDCP COUNT value among packets to be transmitted to the higher layer. According to the definition of RX_DELIV 1810 and NEW_VARIABLE 1820, the expected batch size may be defined as a value generated by subtracting RX_DELIV 1810 from NEW_VARIABLE 1820. According to various embodiments of the disclosure, a parameter RX_NEXT 1830 can be defined as a PDCP COUNT value of a packet to be transmitted to the higher layer after the packet corresponding to the NEW_VARIABLE 1820 has been transmitted to the higher layer.

According to various embodiments of the disclosure, when the expected batch size is larger than or equal to a preset threshold value, the UE may transmit at least one of the requests illustrated in FIGS. 9, 12, and 13 to the BS. Thereafter, the BS may perform an operation corresponding to the received message.

Figure 19A:
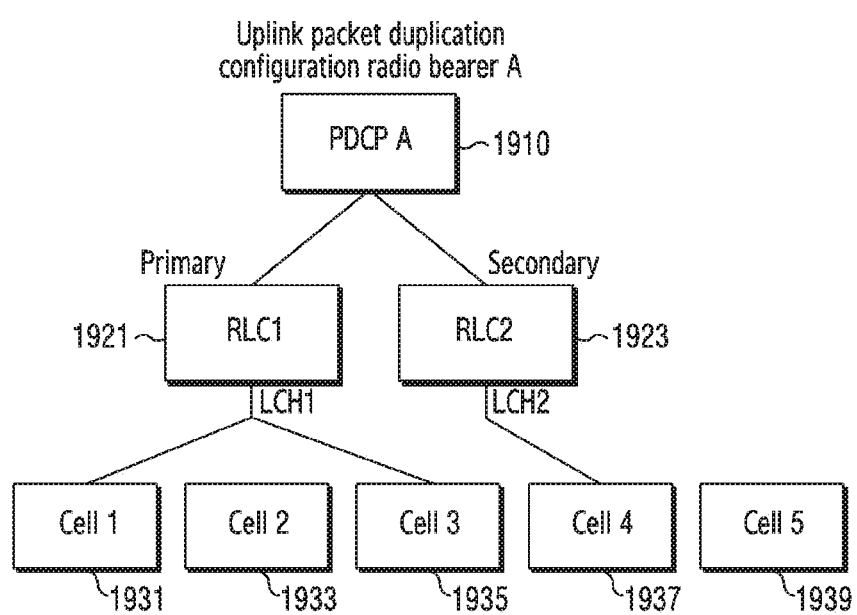
FIGS. 19A and 19B illustrate a procedure of configuring a packet duplication radio bearer in a carrier aggregation (CA) environment in a wireless communication system according to various embodiments of the disclosure.
Figure 19B:
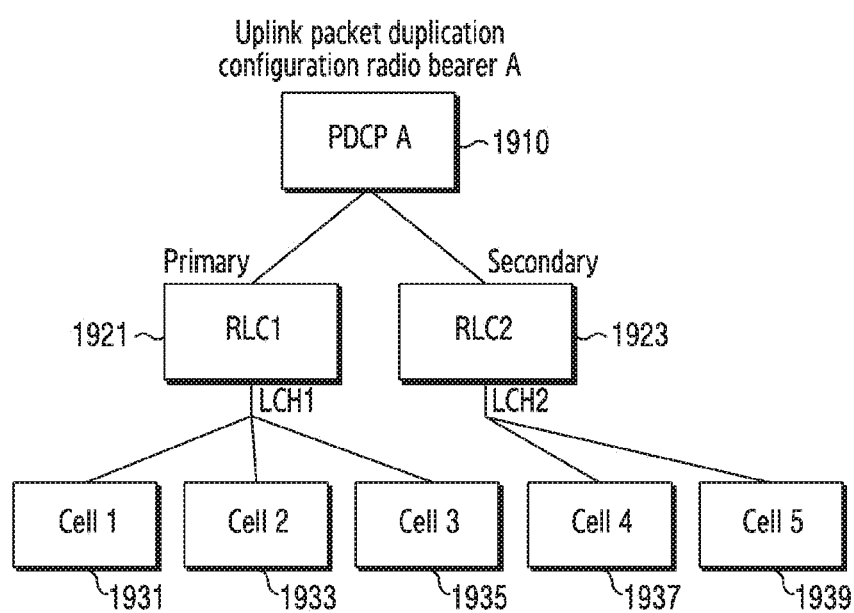

FIGS. 19A and 19B illustrate a procedure of configuring a packet duplication radio bearer in a carrier aggregation (CA) environment in a wireless communication system according to various embodiments of the disclosure.

According to various embodiments of the disclosure, packet duplication means independent transmissions are performed by transmitting a PDCP PDU generated by the PDCP entity to each of at least two RLC entities. Since the packet can be transmitted to at least two radio links according to the application of packet duplication, the probability of successful transmission of the packet may increase, or a transmission delay time may decrease.

Referring to FIGS. 19A and 19B, a PDCP entity A 1910 corresponds to a radio bearer A and may be connected to RLC1 1921, which is a primary RLC, and RLC2 1923, which is a secondary RLC. RLC1 1921 and RLC2 1923 correspond to logical channel 1 (LCH1) and logical channel 2 (LCH2), respectively. In the carrier aggregation environment, a plurality of cells may exist, and a limit on cells that can be used for each logical channel may be set not to transmit packets together by the RLC entities. According to FIGS. 19A and 19B, for uplink packet duplication configuration, logical channel 1 (LCH1) may use cell 1 1931 and cell 3 1935 and logical channel 2 (LCH2) may use cell 4 1937. A list of cells available for the logical channels may be set through a radio resource control (RRC) message of the BS. The uplink packet duplication configuration may comprise at least one of packet duplication radio bearer configuration, a list of cells that can be used by the logical channels, or configuration of whether to activate or deactivate packet duplication, and the UE performs a packet duplication procedure according to the configuration of the BS.

However, downlink packet duplication may be performed only through implementation by the BS, and the BS may not notify the UE of a list of cells that can be used by the logical channels and the time point at which packet duplication is performed under a packet duplication radio bearer configuration. Accordingly, the downlink packet duplication may be performed by determination of a downlink scheduler of the BS or a preset scheme. In the downlink packet duplication configuration illustrated in FIGS. 19A and 19B, similar to the uplink configuration, the PDCP entity A 1910 may correspond to a radio bearer A and may be connected to RLC1 1921, which is a primary RLC, and RLC2 1923, which is a secondary RLC. RLC1 1921 and RLC2 1923 correspond to logical channel 1 (LCH1) and logical channel 2 (LCH2), respectively. However, unlike the uplink configuration, according to the downlink packet duplication configuration, logical channel 1 (LCH1) may use cell 1 1931, cell 2 1933, and cell 3 1935 and logical channel 2 (LCH2) may use cell 4 1937 and cell 5 1939. The UE may not be notified of this configuration in advance. Accordingly, the UE cannot determine that the downlink packet duplication configuration is the same as the uplink configuration.

Figure 20A:
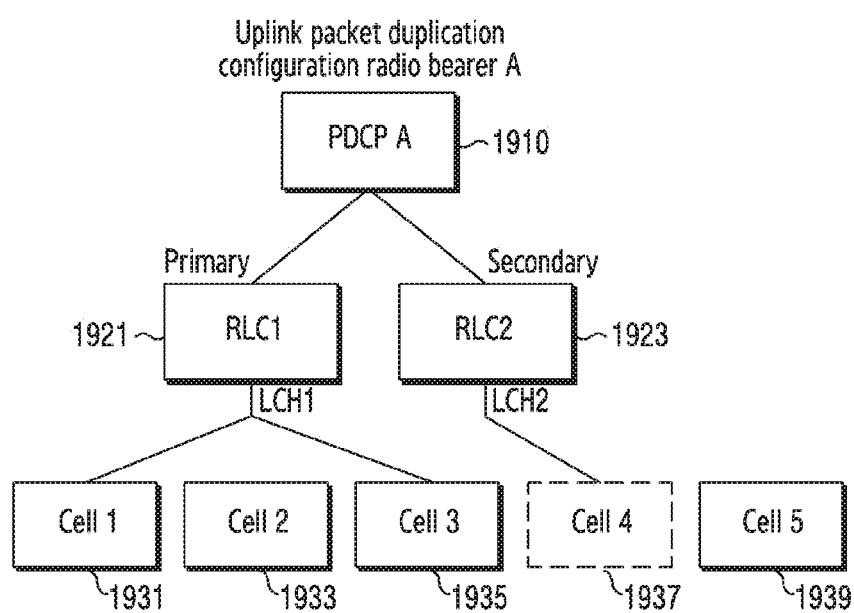
FIGS. 20A and 20B illustrate an example of the operation related to the packet duplication radio bearer in a carrier aggregation environment in a wireless communication system according to various embodiments of the disclosure.
Figure 20B:
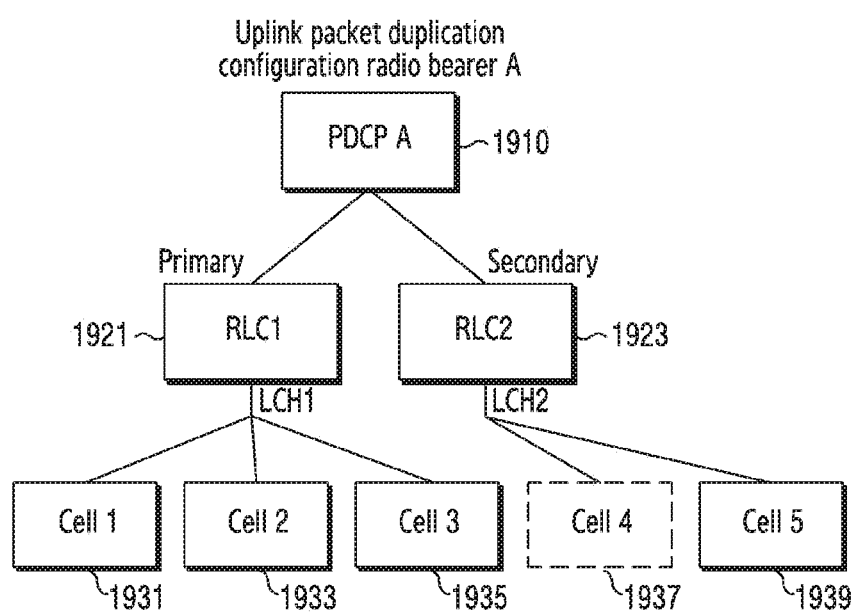

FIGS. 20A and 20B illustrate an example of operation related to the packet duplication radio bearer in a carrier aggregation environment in a wireless communication system according to various embodiments of the disclosure.

Referring to FIGS. 20A and 20B, it is assumed that cell 4 1937 is deactivated in the packet duplication radio bearer configuration, which is the same as that in FIGS. 19A and 19B. Cell deactivation may comprise secondary cell (SCell) activation/deactivation, and may be configured by a media access control (MAC) control element (CE), or may be configured after a preset timer time of cell data transmission/reception passes. At this time, when cell 4 1937 is deactivated, there is no cell that logical channel 2 (LCH2) can use for uplink transmission. At this time, an uplink data packet (for example, RLC PDU) generated in logical channel 2 (LCH2) or a control packet (control PDU) such as an RLC status PDU may not be transmitted.

Figure 21:
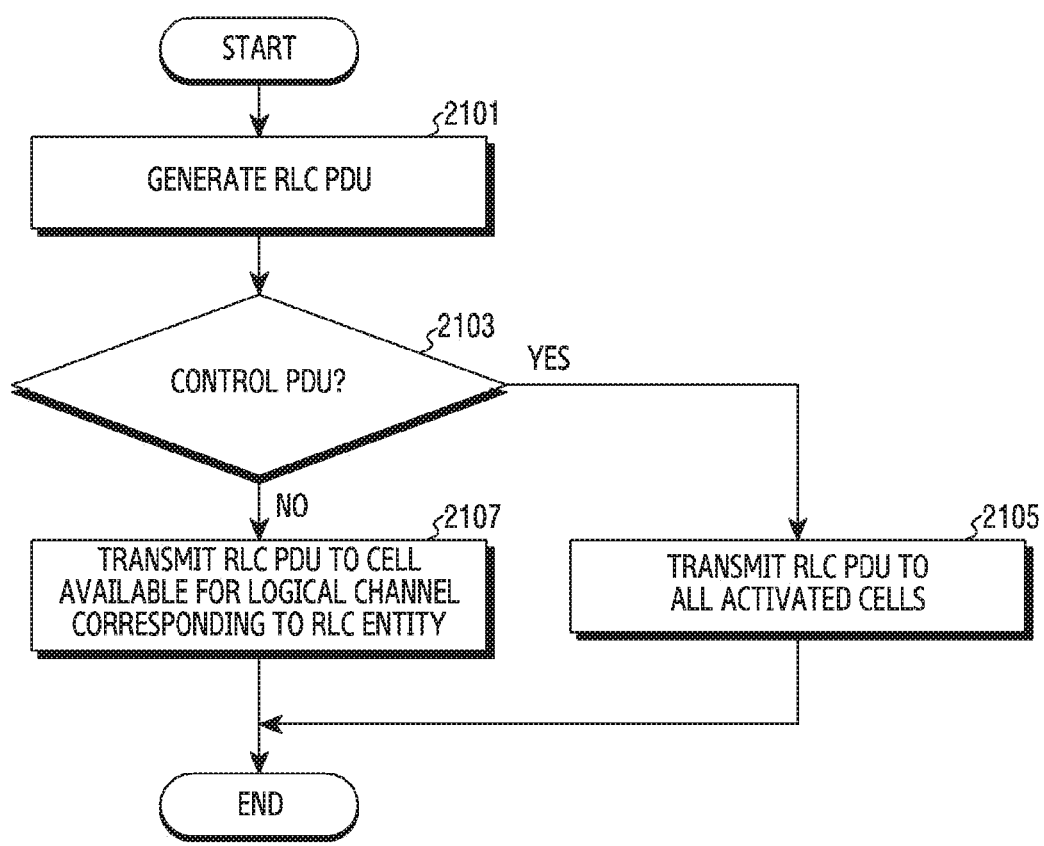
FIG. 21 is a flowchart illustrating the operation of the UE related to the packet duplication radio bearer in a carrier aggregation environment in a wireless communication system according to various embodiments of the disclosure.

FIG. 21 is a flowchart illustrating the operation of the UE related to the packet duplication radio bearer in a carrier aggregation environment in a wireless communication system according to various embodiments of the disclosure. FIG. 21 shows the operation of the UE 120.

As described with reference to FIGS. 20A and 20B, uplink transmission of a data packet or a control packet (for example, a control PDU) may not be performed by deactivation of the cell. However, the control packet may be an RLC status PDU, which is a feedback for downlink data, and when the RLC status PDU is not transmitted, the BS may not recognize whether the downlink data is received.

According to various embodiments of the disclosure, the UE may operate as illustrated in FIG. 21.

Referring to FIG. 21, in operation 2101, the UE detects the occurrence of an RLC PDU.

In operation 2103, the UE determines whether the generated RLC PDU is a control PDU.

When the RLC PDU generated by the RLC entity of the UE is a control PDU, the UE transmits the control PDU to one cell among all of the activated cells at the time of transmission regardless of a cell available for a logical channel corresponding to the corresponding RLC entity in operation 2105. In this case, even when there is no cell available for the logical channel, the control PDU can be transmitted, so that feedback for the downlink packet can be realized.

When the RLC PDU generated by the RLC entity of the UE is not a control PDU, the UE transmits the RLC PDU only to a cell available for a logical channel in operation 2107. When there is no available cell, transmission may be delayed until a cell becomes available.

As illustrated in FIG. 21, it is determined whether the RLC PDU generated in operation 2103 is a control PDU, but it may be determined whether the generated RLC PDU is an RLC status PDU. In other words, when the RLC PDU generated in operation 2103 is an RLC status PDU, the UE may transmit the control PDU to one cell among all of the activated cells at a transmission time regardless of a cell available for a logical channel corresponding to the corresponding RLC entity. The embodiment described with reference to FIG. 21 may be applied to the case in which there is no cell available for the logical channel.

Figure 22:
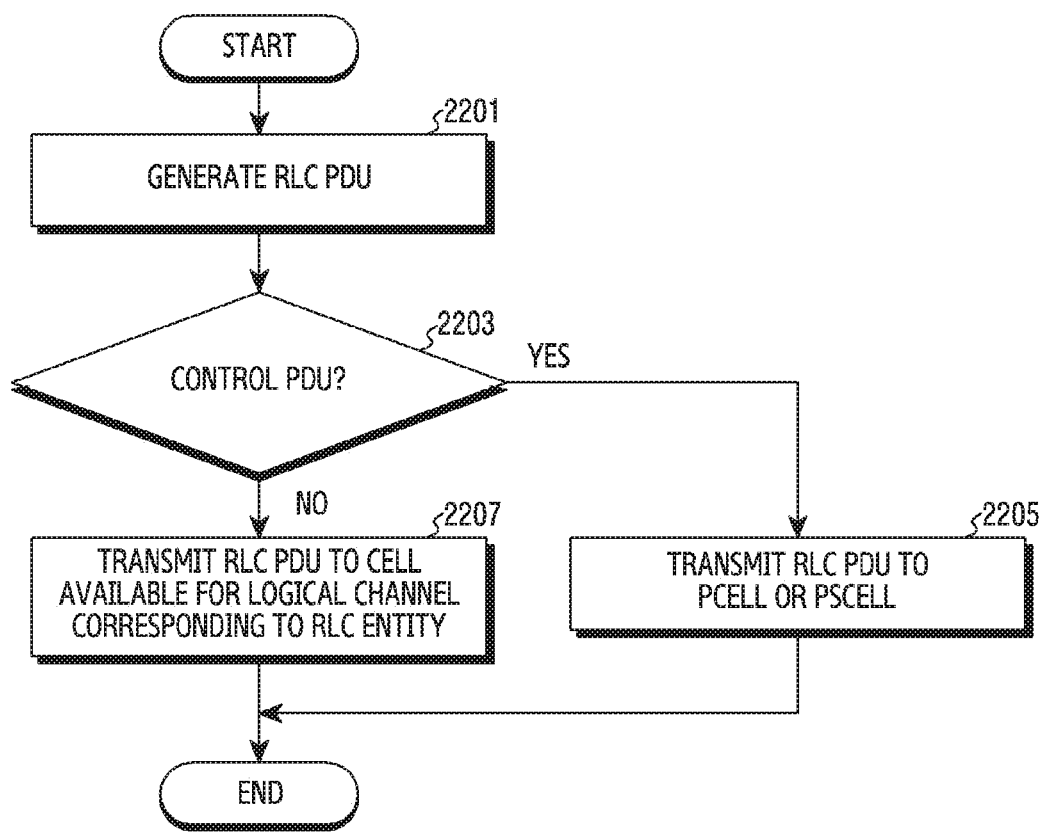
FIG. 22 is a flowchart illustrating the operation of the UE related to the packet duplication radio bearer in a carrier aggregation environment in a wireless communication system according to various embodiments of the disclosure.

FIG. 22 is a flowchart illustrating the operation of the UE related to the packet duplication radio bearer in a carrier aggregation environment in a wireless communication system according to various embodiments of the disclosure.

As described with reference to FIGS. 20A and 20B, uplink transmission of a data packet or a control packet (for example, a control PDU) may not be performed by deactivation of the cell. However, the control packet may be an RLC status PDU, which is a feedback for downlink data, and when the RLC status PDU is not transmitted, the BS may not recognize whether the downlink data is received.

According to various embodiments of the disclosure, the UE may operate as illustrated in FIG. 22.

Referring to FIG. 22, in operation 2201, the UE detects the occurrence of an RLC PDU.

In operation 2203, the UE determines whether the generated RLC PDU is a control PDU.

When the RLC PDU generated by the RLC entity of the UE is a control PDU, the UE transmits the control PDU to a primary cell (PCell) or a primary secondary cell (PSCell) regardless of a cell available for a logical channel corresponding to the corresponding RLC entity in operation 2205. In this case, even when there is no cell available for the logical channel, the control PDU can be transmitted, so that feedback for the downlink packet can be realized.

When the RLC PDU generated by the RLC entity of the UE is not a control PDU, the UE transmits the RLC PDU only to a cell available for a logical channel in operation 2207. When there is no available cell, transmission may be delayed until a cell becomes available.

As illustrated in FIG. 22, it is determined that the RLC PDU generated in operation 2203 is a control PDU, but is may be determined that the generated RLC PDU is an RLC status PDU. In other words, when the RLC PDU generated in operation 2203 is an RLC status PDU, the UE may transmit the control PDU to the PCell or the PSCell regardless of a cell available for a logical channel corresponding to the corresponding RLC entity. The embodiment described with reference to FIG. 22 may be applied to the case in which there is no cell available for the logical channel.

Figure 23:
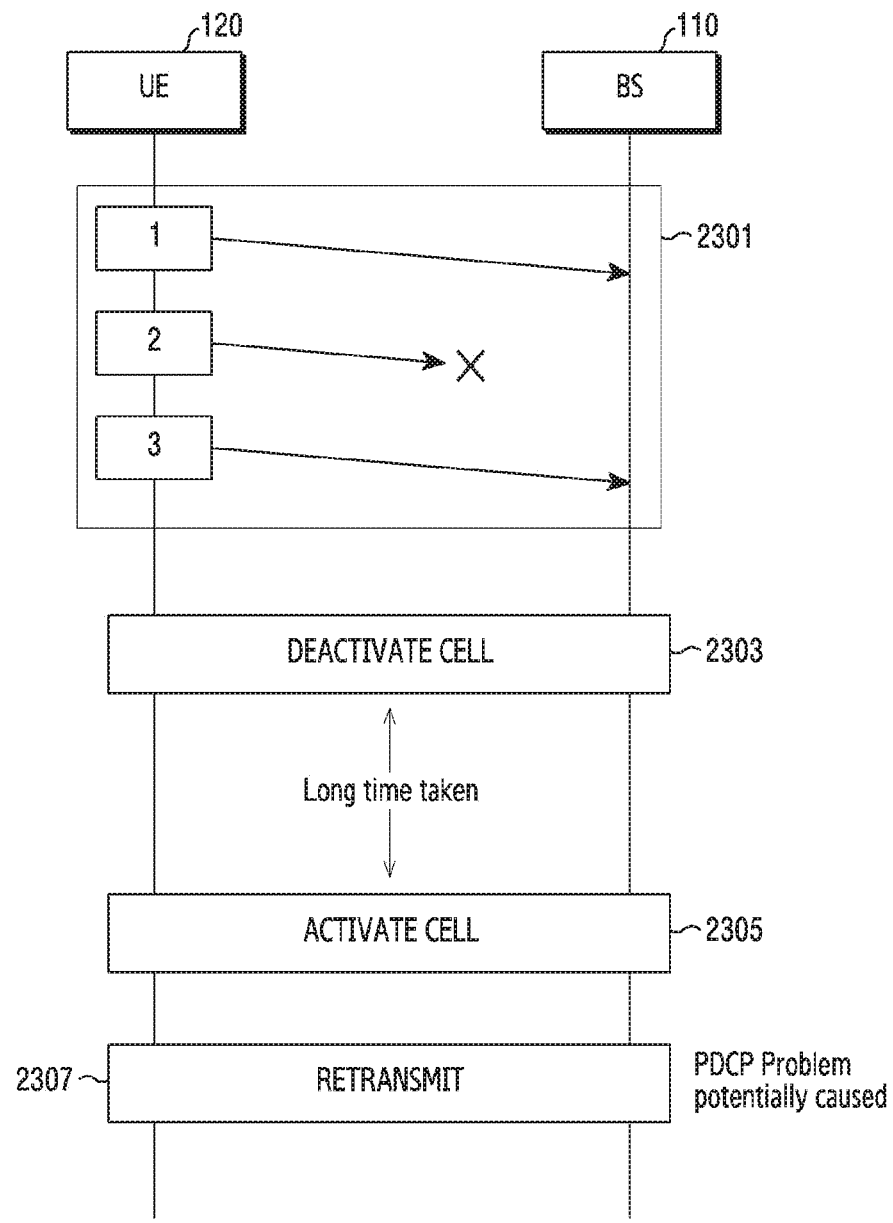
FIG. 23 illustrates signal flow between the BS and the UE for a retransmission operation related to the packet duplication radio bearer in a carrier aggregation environment in a wireless communication system according to various embodiments of the disclosure.

FIG. 23 illustrates a signal flow between the BS and the UE for a retransmission operation related to the packet duplication radio bearer in a carrier aggregation environment in a wireless communication system according to various embodiments of the disclosure. FIG. 23 shows a signal flow between the BS 110 and the UE 120.

Referring to FIG. 23, in operation 2301, the UE transmits packets 1 to 3 to the BS. In FIG. 23, it is assumed that packet 2 is not successfully received by the BS.

In operation 2303, all cells available for a logical channel are deactivated. That is, in FIG. 23, it is assumed that all cells available for the logical channel are deactivated and thus there is no cell for uplink transmission.

The deactivated cells are activated again in operation 2305, and the UE retransmits packet 2 in operation 2307.

Since the cell deactivation period is longer than a delay time for packet retransmission, retransmission of packet 2 by the UE after the uplink cell for packet transmission is activated may cause a potential problem. Another RLC entity of the packet duplication radio bearer may continuously perform packet transmission and a plurality of packets may be transmitted while the cell is deactivated. Accordingly, when packet 2 is transmitted after cell activation and thus arrives at the PDCP entity of the BS receiver late, hyper frame number (HFN) desynchronization or abnormal shift of the PDCP reception window may occur. Further, when packet 2 is transmitted after a considerable time from a packet generation time point, packet 2 may not comprise useful information anymore. However, when the UE does not transmit packet 2, a gap may be generated between RLC sequence numbers, so that the RLC operation may have a problem.

Figure 24:
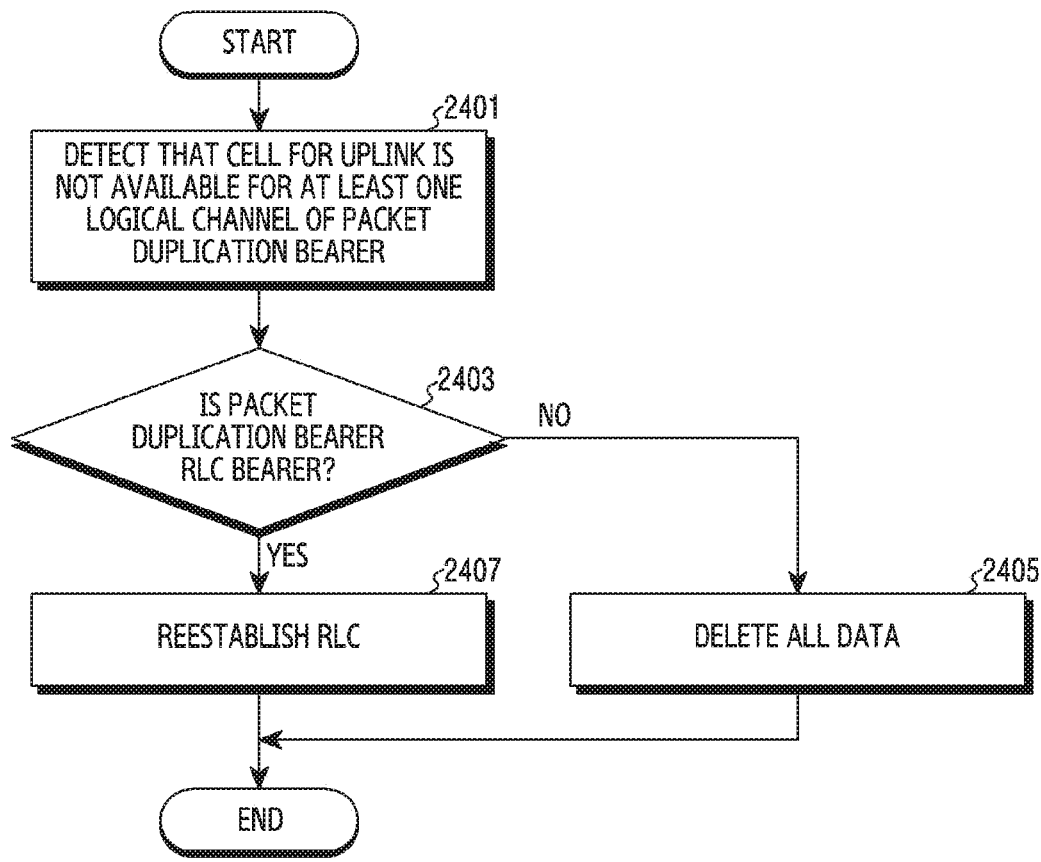
FIG. 24 is a first example of a flowchart illustrating the operation of the UE in a carrier aggregation environment in a wireless communication system according to various embodiments of the disclosure.

FIG. 24 is a first example of a flowchart illustrating the operation of the UE in a carrier aggregation environment in a wireless communication system according to various embodiments of the disclosure. FIG. 24 shows the operation of the UE 120.

Referring to FIG. 24, in operation 2401, the UE detects that a cell for the uplink is not available for at least one logical channel of the packet duplication bearer.

In operation 2403, the UE determines whether the packet duplication bearer is an RLC acknowledgement mode (AM) bearer.

When the packet duplication bearer is an RLC AM bearer, the UE performs RLC re-establishment with the BS in operation 2407. Although not illustrated, the UE may make a request for re-establishing the RLC entity to the BS and inform the BS that there is no cell for the uplink available for the logical channel corresponding to the RLC entity in operation 2407.

When the packet duplication bearer is not an RLC AM bearer, the UE may delete all data packets of the RLC entity in operation 2405. Through the deletion of the data packets, the problems illustrated in FIG. 23 may be resolved.

Figure 25:
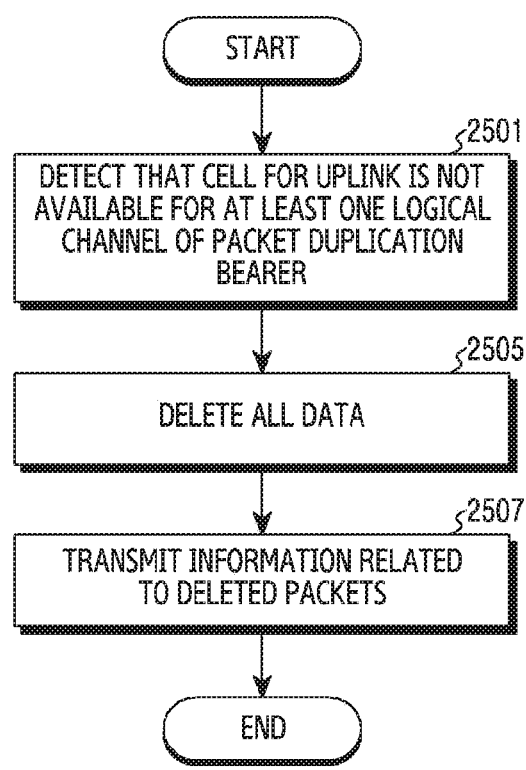
FIG. 25 is a second example of a flowchart illustrating the operation of the UE in a carrier aggregation environment in a wireless communication system according to various embodiments of the disclosure.

FIG. 25 is a second example of a flowchart illustrating the operation of the UE in a CA environment in a wireless communication system according to various embodiments of the disclosure. FIG. 25 shows the operation of the UE 120.

Referring to FIG. 25, in operation 2501, the UE detects that a cell for the uplink is not available for at least one logical channel of the packet duplication bearer.

In operation 2505, the UE may delete all data packets of the RLC entity.

In operation 2507, the UE transmits information related to the deleted packet from the BS. That is, the deletion of all data packets of the RLC entity does not guarantee the normal operation of the BS, so that the UE transmits information on the deleted packets to the BS after the cell is activated. According to various embodiments of the disclosure, the information on the deleted packets may comprise at least one of a header-only packet, in which a data field indicating sequence numbers of the deleted packets does not exist, or discarded information packet, in which information corresponding to the sequence numbers of the deleted packets is recorded.

According to various embodiments of the disclosure, information related to the deleted packets may be transmitted even though the cell is not activated. For example, the UE may transmit the information related to the deleted packets through a cell which is not available for the logical channel although the PCell and/or PSCell are activated.

Figure 26:
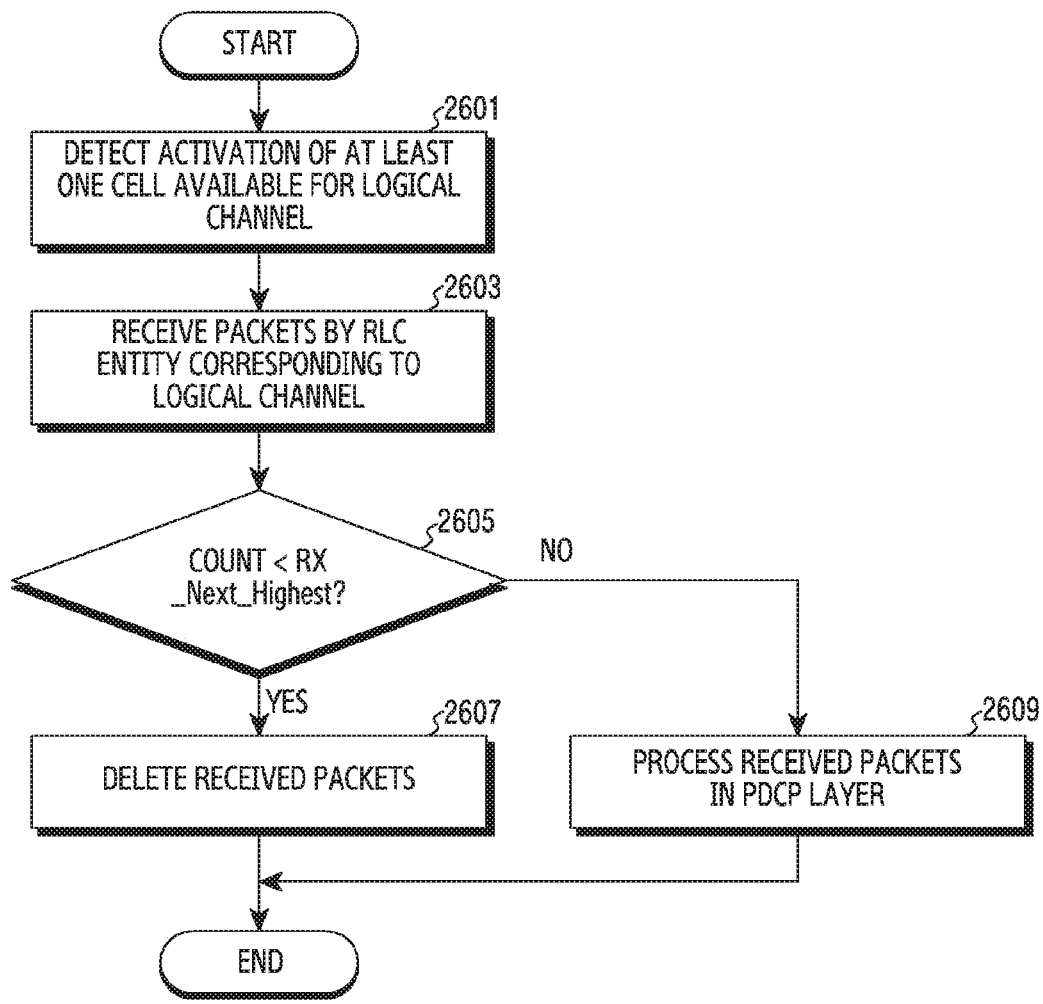
FIG. 26 is a third example of a flowchart illustrating the operation of the UE in a carrier aggregation environment in a wireless communication system according to various embodiments of the disclosure.

FIG. 26 is a third example of a flowchart illustrating the operation of the UE in a carrier aggregation environment in a wireless communication system according to various embodiments of the disclosure. FIG. 26 shows the operation of the UE 120. FIG. 26 is a flowchart illustrating the operation of the UE for dividing packets generated before cell deactivation.

Referring to FIG. 26, in operation 2601, activation of at least one cell available for a logical channel is detected. In other words, the UE detects activation of at least one cell after deactivation of all cells available for the logical channel of the packet duplication radio bearer.

In operation 2603, the UE receives packets by the RLC entity corresponding to the logical channel. The UE may receive packets through an activated cell.

In operation 2605, the UE determines whether a COUNT value of the received packet is smaller than an RX_Next_Highest value. The RX_Next_Highest value refers to the packet corresponding to the largest COUNT received before cell activation.

When the COUNT value of the received packet is smaller than the RX_Next_Highest value, the UE deletes the received packet from the PDCP entity in operation 2607.

When the COUNT value of the received packet is larger than the RX_Next_Highest value, in operation 2609, the UE may perform a procedure such as decoding, integrity check, and reordering of the received packets on the PDCP layer.

Figure 27:
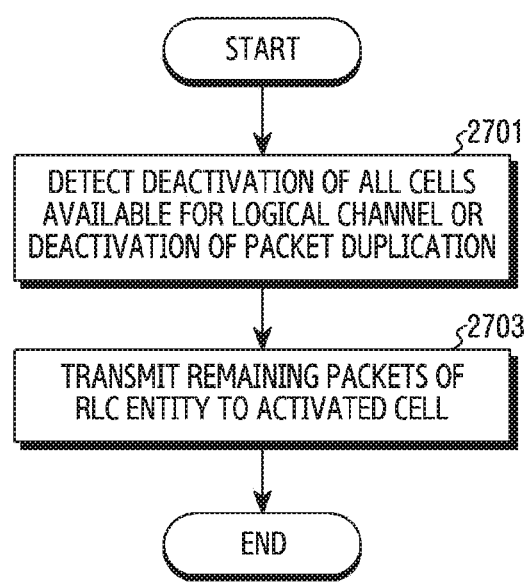
FIG. 27 is a fourth example of a flowchart illustrating the operation of the UE in a carrier aggregation environment in a wireless communication system according to various embodiments of the disclosure.

FIG. 27 is a fourth example of a flowchart illustrating the operation of the UE in a carrier aggregation environment in a wireless communication system according to various embodiments of the disclosure. FIG. 27 shows the operation of the UE 120.

Referring to FIG. 27, in operation 2701, the UE detects deactivation of all cells available for a logical channel or deactivation of packet duplication.

In operation 2703, the UE transmits remaining packets of the RLC entity through at least one of predetermined cells. Although not illustrated, the UE may transmit the remaining packets of the RLC entity through a PCell and/or a PSCell.

According to various embodiments of the disclosure, when packet duplication is deactivated, the UE may transmit the remaining packets of the RLC entity through at least one of predetermined activated cells or through the PCell and/or PSCell of the UE.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may comprise instructions that cause the electronic device to perform the methods according to various embodiments of the disclosure as defined by the appended claims and/or disclosed herein.

The programs (software modules or software) may be stored in nonvolatile memories comprising a random-access memory (RAM) and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be comprised in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component comprised in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
    detecting a buffer overload of a packet data convergence protocol (PDCP) layer of the UE based on a batch size;
    in response to detecting the buffer overload, transmitting, to a base station (BS), a request for a transmission control; and
    receiving, from the BS, one or more packets according to the transmission control,
    wherein the batch size is a difference between a first value and a second value,
    wherein the first value is a PDCP count value for a next packet of a packet transmitted to an upper layer of the PDCP layer, and
    wherein the second value is a PDCP count value that is highest among packets to be transmitted to the upper layer when the next packet is successfully received.

2. The method of claim 1, wherein the transmission control comprises at least one of a transmission time point control, a retransmission time point control, a transmission speed control, or a retransmission speed control.

3. The method of claim 1, wherein the detecting of the buffer overload further comprises:
    identifying a first amount of packets stored in a buffer of the PDCP layer; and
    if the first amount of packets exceeds a first threshold, detecting the buffer overload,
    wherein request for the transmission control comprises reducing a transmission rate of the BS, and
    wherein the first threshold is determined based on a processing capacity of the upper layer.

4. The method of claim 3, further comprising:
    identifying a second amount of packets stored in the buffer; and
    if the second amount of packets is less than a second threshold, transmitting, to the BS, a request for increasing the transmission rate of the BS,
    wherein the second threshold is less than the first threshold.

5. The method of claim 1, further comprising:
    in response to detecting the buffer overload, identifying at least one lost packet or delayed packet, wherein the request for the transmission control comprises information indicating a sequence number of at least one of the lost packet or the delayed packet, and wherein the one or more packets comprises a retransmission of at least one of the lost packet or the delayed packet.

6. The method of claim 1, further comprising:

in response to detecting the buffer overload, adjusting a reception window of the UE to be shrinked, wherein the request for the transmission control indicates the shrinking of the reception window, and wherein the receiving of the one or more packets comprises receiving the one or more packets that are transmitted through a transmission window of the BS adjusted based on the shrinked reception window.

7. An apparatus of a user equipment (UE) in a wireless communication system, the apparatus comprising:

at least one transceiver; and at least one processor operably coupled with the at least one transceiver;

wherein the at least one processor is configured to:

detect a buffer overload of a packet data convergence protocol (PDCP) layer of the UE based on a batch size;

in response to detecting the buffer overload, transmit, to a base station (BS), a request for a transmission control; and receive, from the BS, one or more packets according to the transmission control, wherein the batch size is a difference between a first value and a second value, wherein the first value is a PDCP count value for a next packet of a packet transmitted to an upper layer of the PDCP layer, and wherein the second value is a PDCP count value that is highest among packets to be transmitted to the upper layer when the next packet is successfully received.

8. The apparatus of claim 7, wherein the transmission control comprises at least one of a transmission time point control, a retransmission time point control, a transmission speed control, or a retransmission speed control.

9. The apparatus of claim 7, wherein the at least one processor is further configured to:

identify a first amount of packets stored in a buffer of the PDCP layer; and if the first amount of packets exceeds a first threshold, detect the buffer overload, wherein the request for the transmission control comprises reducing a transmission rate of the BS, and wherein the first threshold is determined based on a processing capacity of the upper layer.

10. The apparatus of claim 9, wherein the at least one processor is further configured to:

identify a second amount of packets stored in the buffer; and if the second amount of packets is less than a second threshold, transmit, to the BS, a request for increasing the transmission rate of the BS, wherein the second threshold is less than the first threshold.

11. The apparatus of claim 7, wherein the at least one processor is further configured to:

in response to detecting the buffer overload, identify at least one lost packet or delayed packet, wherein the request for the transmission control comprises information indicating a sequence number of at least one of the lost packet or the delayed packet, and wherein the one or more packets comprises a retransmission of at least one of the lost packet or the delayed packet.

12. The apparatus of claim 7, wherein the at least one processor is further configured to, in response to detecting the buffer overload, adjust a reception window of the UE to be shrinked, wherein the request for the transmission control indicates the shrinking of the reception window, and wherein the one or more packets are transmitted through a transmission window of the BS adjusted based on the shrinked reception window.

* * * * *